US009272419B2

(12) United States Patent
Keller et al.

(10) Patent No.: US 9,272,419 B2
(45) Date of Patent: Mar. 1, 2016

(54) ROBOTIC PICKING LINE FOR SERIALIZED PRODUCTS

(71) Applicant: Brightstar Corp., Miami, FL (US)

(72) Inventors: Mark J. Keller, Crystal Lake, IL (US); Jesse J. Garcia, Round Lake Beach, IL (US); Matthew Stephen Kolodzej, Volo, IL (US); Karsten Kell, Mundelein, IL (US)

( * ) Notice: Subject to any disclaimer, the term of this patent is extended or adjusted under 35 U.S.C. 154(b) by 0 days.

(21) Appl. No.: 14/064,710

(22) Filed: Oct. 28, 2013

(65) Prior Publication Data

US 2015/0165624 A1      Jun. 18, 2015

Related U.S. Application Data

(62) Division of application No. 12/848,815, filed on Aug. 2, 2010, now Pat. No. 8,571,700.

(51) Int. Cl.
| | |
|---|---|
| *G06F 7/00* | (2006.01) |
| *B25J 9/16* | (2006.01) |
| *G05B 19/12* | (2006.01) |
| *G06Q 10/08* | (2012.01) |

(52) U.S. Cl.
CPC .............. *B25J 9/1687* (2013.01); *G05B 19/12* (2013.01); *G06Q 10/087* (2013.01); *G05B 2219/31286* (2013.01); *G05B 2219/31305* (2013.01)

(58) Field of Classification Search
CPC ........... B65H 2220/01; B65H 2220/02; B65H 2220/11; B65H 2511/51; B65H 2515/342
See application file for complete search history.

(56) References Cited

U.S. PATENT DOCUMENTS

| | | | |
|---|---|---|---|
| 3,687,312 A | 8/1972 | Weir | |
| 4,127,194 A * | 11/1978 | Erikson | ..................... B07C 3/00 118/667 |
| 5,363,310 A | 11/1994 | Haj-Ali-Ahmadi et al. | |
| 5,593,267 A | 1/1997 | McDonald et al. | |
| 5,870,717 A | 2/1999 | Wiecha | |
| 6,123,259 A | 9/2000 | Ogasawara | |
| 6,847,861 B2 | 1/2005 | Lunak et al. | |
| 6,892,890 B2 * | 5/2005 | Dominguez | .......... B07C 5/3412 209/559 |
| 7,389,294 B2 | 6/2008 | Kotas et al. | |
| 7,689,318 B2 | 3/2010 | Draper | |
| 7,693,757 B2 | 4/2010 | Zimmerman | |

(Continued)

FOREIGN PATENT DOCUMENTS

CA        2544433 A1      5/2005

OTHER PUBLICATIONS

Declaration of Karsten Kell and Exhibit A.

(Continued)

*Primary Examiner* — Yolanda Cumbess
(74) *Attorney, Agent, or Firm* — K&L Gates LLP

(57) ABSTRACT

Various embodiments are directed to a system for managing an inventory comprising serialized products. A computer system may receive from an intake sensor a first tray identifier describing a first tray present on an intake transport system. The computer system may also associate the first tray identifier with a first serial identifier of a first product unit present on a product transport system and instructing the product transport system, by the computer system, to transport the first product unit to the first tray. Additionally, the computer system may instruct a robot to place the first tray containing the first product unit at a first bin selected from a plurality of robot-accessible bins.

13 Claims, 18 Drawing Sheets

(56) References Cited

U.S. PATENT DOCUMENTS

| | | |
|---|---|---|
| 7,707,070 B2 | 4/2010 | Finke et al. |
| 7,904,975 B2 | 3/2011 | Kruglikov et al. |
| 7,979,291 B2 | 7/2011 | Sussman et al. |
| 8,055,377 B2 | 11/2011 | Yair et al. |
| 8,086,344 B1 | 12/2011 | Mishra et al. |
| 8,140,183 B2 | 3/2012 | Waddington et al. |
| 8,175,748 B2 | 5/2012 | Matsumoto et al. |
| 8,262,842 B2 | 9/2012 | Szesko et al. |
| 8,566,193 B2 | 10/2013 | Singh et al. |
| 8,571,700 B2 | 10/2013 | Keller |
| 2005/0108324 A1 | 5/2005 | Stritzinger et al. |
| 2007/0124217 A1 | 5/2007 | Terry et al. |
| 2007/0214065 A1 | 9/2007 | Kahlon et al. |
| 2009/0012667 A1* | 1/2009 | Matsumoto .......... G05D 1/0251 701/26 |
| 2009/0112675 A1 | 4/2009 | Servais |
| 2012/0029685 A1 | 2/2012 | Keller et al. |
| 2012/0030070 A1 | 2/2012 | Keller et al. |
| 2014/0279212 A1 | 9/2014 | Bennett et al. |
| 2014/0358277 A1 | 12/2014 | Keller et al. |

OTHER PUBLICATIONS

Restriction Requirement mailed Oct. 2, 2012 in U.S. Appl. No. 12/848,811.
Office Action mailed Apr. 24, 2013 in U.S. Appl. No. 12/848,811.
Office Action mailed Nov. 7, 2013 in U.S. Appl. No. 12/848,811.
Restriction Requirement mailed Apr. 6, 2012 in U.S. Appl. No. 12/848,806.
Office Action mailed Aug. 29, 2012 in U.S. Appl. No. 12/848,806.
Office Action mailed Apr. 16, 2013 in U.S. Appl. No. 12/848,806.
Restriction Requirement mailed Nov. 8, 2012 in U.S. Appl. No. 12/848,815.
Office Action mailed Feb. 20, 2013 in U.S. Appl. No. 12/848,815.
Notice of Allowance mailed Jun. 25, 2013 in U.S. Appl. No. 12/848,815.
Notice of Allowance mailed Apr. 2, 2014 in U.S. Appl. No. 12/848,811.
Office Action mailed Apr. 30, 2014 in U.S. Appl. No. 12/848,806.
Notice of Abandonment mailed Nov. 28, 2014 in U.S. Appl. No. 12/848,806.
Office Action mailed Jan. 6, 2015 in U.S. Appl. No. 14/462,260.
U.S. Appl. No. 14/528,640, filed Oct. 30, 2014.

* cited by examiner

ROBOTIC PICKING LINE FOR SERIALIZED PRODUCTS

This application is a divisional of U.S. patent application Ser. No. 12/848,815, filed on Aug. 2, 2010 and incorporated herein by reference in its entirety.

BACKGROUND

Serialized products are products where each unit is described by a unique serial identifier. A product unit's serial identifier may be used to facilitate activation of the product unit and, in some cases, is also used during operation. Network devices, such as mobile telephones, smart phones, net books, mobile modems, etc., are examples of serialized products. During the activation process, a network device's serial identifier is associated with an end user or account. When the network device attempts to access a proprietary or subscription-based network, the device's serial identifier may be utilized to determine whether the device is authorized for access (e.g., based on whether the serial identifier is associated with an account in good standing, based on whether the associated account provides for the requested service, etc.).

Serialized products may also provide other features including, for example, theft prevention and product tracking. For theft prevention, each product unit may be stocked in a disabled state. During the sales process, the seller may activate the product unit by storing its serial identifier at a central network location in a manner indicating that the product unit is authorized to activate. When an end user attempts to turn the product unit on, the product unit may contact the central network location. The product unit may turn on only if its unique identifier is indicated to be activated. Because product unit activation takes place during payment, an unauthorized user of the unit (e.g., a thief) may not be able to use it. For product tracking, a unique identifier may be used to monitor the life of a product unit including, for example, sales to an end user, repair instances, returns, etc.

It is important for retailers of serialized products to match each purchaser or end user with a specific product unit. For example, an end user of a mobile telephone must be provided with the specific mobile telephone unit that was activated on the end user's account. Otherwise, the end user's mobile network carrier will not recognize the mobile telephone as being associated with the end user's account. Also, the end user of a theft-protected product must be provided with a product unit that has been activated at the central network location. Otherwise, the end user will not be able to use the product unit.

Product and end user matching can be relatively simple at a retail location where the serialized products are physically in-stock. For example, a retail clerk may pick a product unit from stock to initiate activation. Activating the product unit may involve initiating a contract between the end user and a network service provider, adding the product unit to an existing service provider account, marking the product unit as activated at a central network location, etc. The activation may be performed by the retailer or a separate activation entity (e.g., a mobile network or service provider). If the activation is successful, then the picked product unit may be sold to the end user. If the activation fails, the clerk can physically return the unit to stock. According to this example, however, the end user must buy the product at a physical store location. Also, the retailer must carry enough product stock at each retail location to satisfy all potential end users at that location, or risk losing business.

Warehouse-based sales of serialized products overcome some of the short-comings of in-stock retailing. For example, retailers that sell serialized products from a warehouse may not need to keep as much in-store inventory. Also, warehouse-based sales may eliminate the need for purchasers to buy serialized products at physical store locations altogether. Internet, mail-order, telephone and other communications techniques may be used. In addition to these advantages, however, warehouse-based sales of serialized products introduce enormous complexities and problems of their own. For example, a single warehouse typically services multiple retail locations and/or on-line retailers, resulting in much higher sales volume than a single physical store location. It is much more difficult to match a product unit to an order as the number of product units in-stock and the number of orders increase. Accordingly, systems and methods are needed to control and scale the process of serialized product inventory management.

FIGURES

Various embodiments of the present invention are described here by way of example in conjunction with the following figures, wherein.

DESCRIPTION

Figure 1:
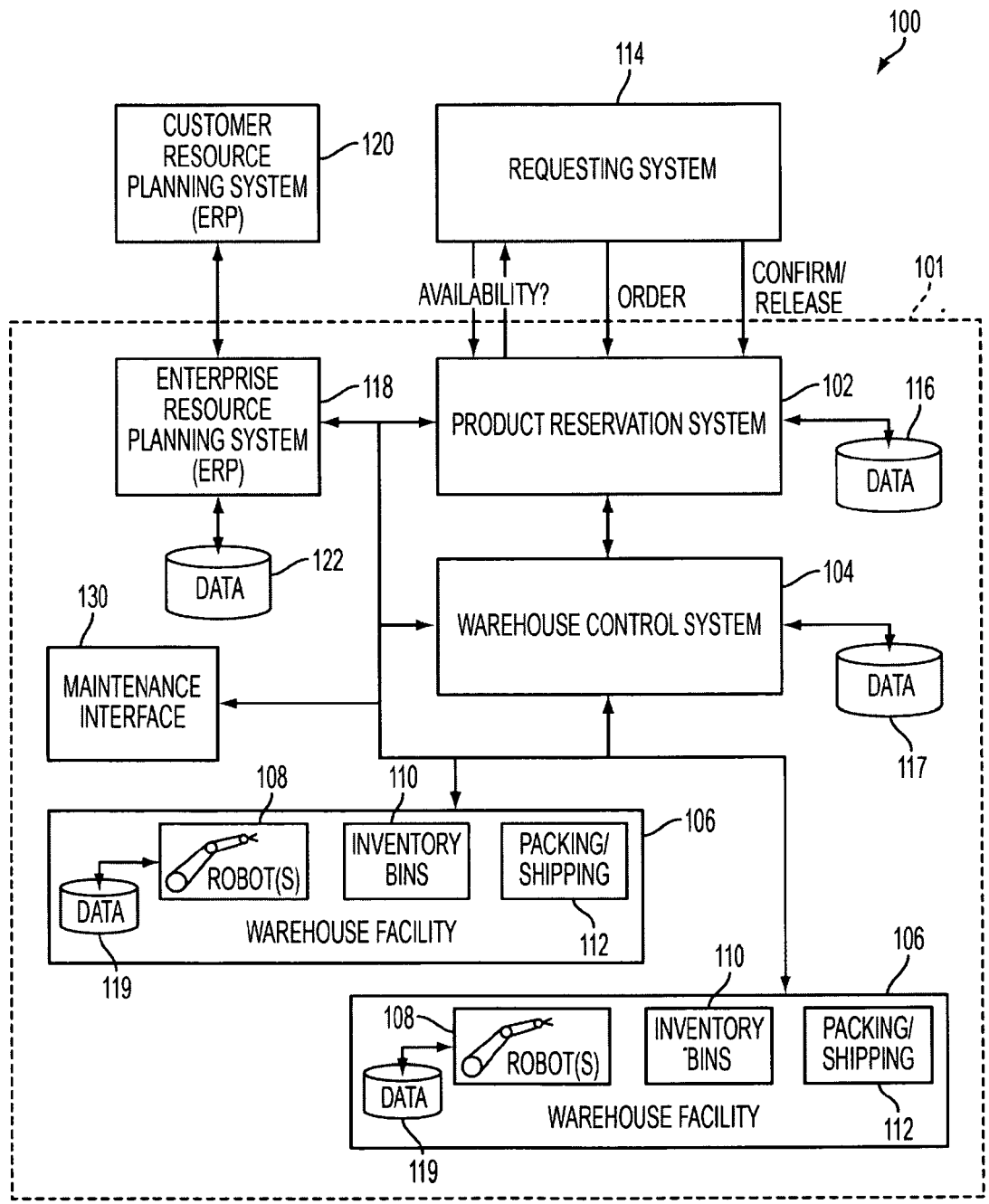
FIG. 1 illustrates a block diagram of one embodiment of a computerized system for managing an inventory comprising serialized products.

Various embodiments are directed to systems and methods for managing and distributing an inventory including serialized products. Each unit of a serialized product may be described by a unique serial identifier. The serial identifier of a product unit may be associated with the product unit itself (e.g., an International Mobile Equipment Identifier (IMEI) or other serial number). In addition, or instead, a product unit's serial identifier may be associated with a potentially removable component of the product unit. For example, the product unit's serial identifier may comprise a Subscriber Identity Module (SIM) number or Media Access Control (MAC) address associated with a card or other hardware or software installed in the product unit. In some embodiments, a product unit's serial identifier may comprise both a portion associated with the unit itself and a portion associated with a unit component. For example, the serial identifier of some network devices may comprise both a SIM number and an identifier specific to the unit.

In some embodiments, the inventory may also comprise non-reserved products. Non-reserved products may comprise non-serialized products and/or non-reserved serialized products. Non-serialized products may include any sort of product that either does not have a unique serial identifier, or does not require that specific product units be matched with end users. For example, in the context of mobile phone sales, non-serialized products may include accessories such as chargers, ear pieces, etc. Non-reserved serialized products may be serialized products that are stocked for sale without activation. For example, some purchasers of serialized products may activate the serialized product units after purchase, eliminating the requirement that individual product units be matched with individual end users at the time of purchase.

The inventory may be stored at one or more warehouse facilities. Each warehouse facility may comprise a plurality of inventory bins, where each bin connotes any specific location where inventory may be stored. For example, a bin may refer to a physical container for holding product items and/or simply to a location on a shelf. One or more of the warehouse facilities may comprise a robot or other automated picking unit configured to place product units at and retrieve product units from the inventory bins. The operation of the robot, and of other aspects of the warehouse facilities, may be directed by a computerized warehouse control system or other suitable computer system or systems. According to various embodiments, at least a portion of the inventory bins for serialized products may be configured to hold a single product unit such that there is a one-to-one relationship between a serialized product unit and a corresponding inventory bin.

The inventory may be managed and/or tracked by a computerized product reservation system. The product reservation system may monitor the status and location of each serialized product unit of the inventory and may handle orders for product units. Orders may be received from computerized requesting systems. For example, the product reservation system may receive, directly or indirectly, from a requesting system an order specifying a first serialized product. If a unit of the first serialized product is available, the product reservation system may reserve the unit and provide the unit's serial identifier to the requesting system. The requesting system may subsequently confirm or release the order. For example, the requesting system may utilize the product unit's serial identifier to attempt to activate the product unit. If the identified product unit is successfully activated, the requesting system may confirm the order. If the identified product unit is not successfully activated (e.g., the end user's contract is declined, the end user decides not to complete the transaction, etc.), then the requesting system may release the order. It will be appreciated that activation may be performed by the requesting system or by a separate activation entity (e.g., a service or network provider). Upon confirmation, the warehouse control system may pick the reserved product unit and provide the unit to the customer and/or end user (e.g., ship the product unit to the customer or end user). For example, the automated picking unit may pick the reserved product unit from a known inventory bin. If the order is released, the product reservation system may release the reserved product unit, making it available for additional orders. It will be appreciated that the activation process may be transparent to the product reservation system and/or the warehouse control system.

According to various embodiments, the systems and methods described herein may be utilized by a distributor entity to make the inventory available to be sold to and/or by one or more customer entities (e.g., and units thereof). For example, orders for serialized products may originate from purchasers through a customer entity. The customer entity (e.g., via a requesting system) may generate the order based on the desired purchase of its purchaser. Once the order is provided to the warehouse distributor entity, it may be filled as described herein.

FIG. 1 illustrates a block diagram of one embodiment of a computerized system 100 for managing an inventory comprising serialized products. The system 100 may comprise various computer systems including, for example, a product reservation system 102 and a warehouse control system 104. The product reservation system 102 and/or the warehouse control system 104 may be in communication with one or more warehouse facilities 106. The warehouse facilities 106 may comprise inventory bins 110 for storing product units making up the inventory. In some embodiments, warehouse facilities 106 may comprise packing and/or shipping facilities 112 for preparing orders. Also, according to various embodiments, some or all of the warehouse facilities 106 may comprise one or more robots or other automated picking units 108 for placing product units to and retrieving product units from the inventory bins 110. The robot or robots 108 may be in communication with one or more data stores 119 for storing data.

The robot 108 may be or comprise any suitable type of automated pick-and-place device. For example, the robot 108 is described herein as a robot arm 1226 that is slidable on a rail 1204 to place and remove product units at robot-accessible bins locations 1114, 1116 (See FIGS. 11-12). According to various embodiments, such a robot 108 may be obtained from WYNRIGHT INTERLOGISTICS of Elk Grove, Ill. It will be appreciated, however, that the robot 108 may comprise any other type of automated picking device configured to respond to commands in the manner described herein to store and retrieve product units. Examples of other known automating picking devices include, automated fork lifts, automated shelving units, automated carrousel systems, automated mini-loaders, automated vacuum delivery systems, automated sorters, etc.

Figure 2:
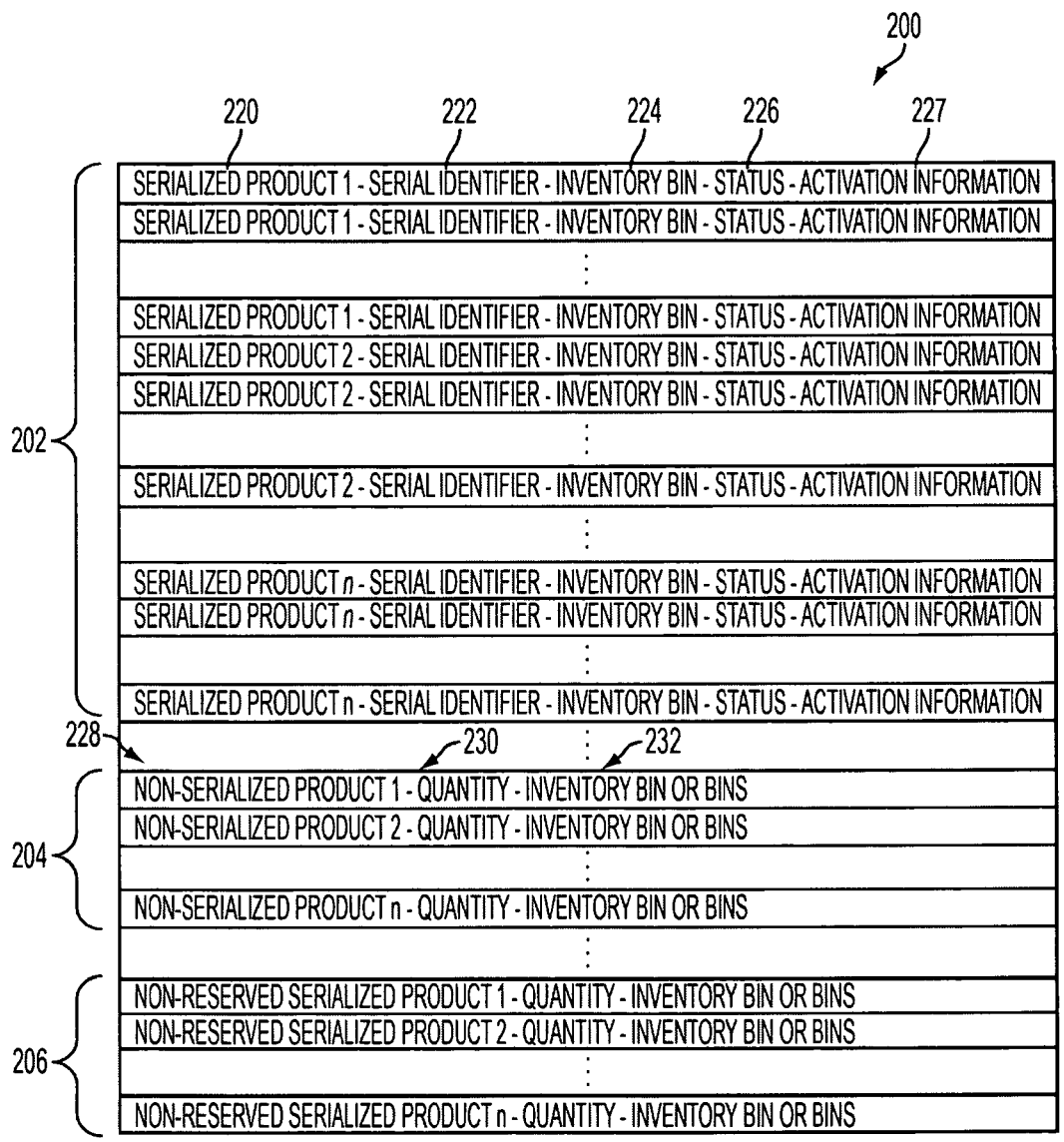
FIG. 2 illustrates a block diagram of one embodiment of a basic data structure that may be used by the product reservation system for describing the inventory.

The product reservation system 102 may track and/or manage the inventory. For example, the product reservation system 102 may track and maintain data describing the status of product units included in the inventory. The data may be stored, for example, at one or more data stores 116. The product reservation system 102 may track the status of all products in the inventory or, in various embodiments, may track the status of serialized products only. FIG. 2 illustrates a block diagram of one embodiment of a basic data structure 200 that may be used by the product reservation system 102 for keeping data describing the inventory. The data structure 200 is described to illustrate the types of data that may be kept by the product reservation system 102 regarding the status of the inventory.

According to the example data structure 200, each unit of serialized products 202 may be individually assigned a status and activation information. For each serialized product unit, the data structure 200 may indicate a product (220), a unique serial identifier (222), an inventory bin 110 where the product unit is located (224) a status (226) and activation information (227). The activation information (227) may describe the activation process including, for example, an activation entity for activating the product unit, a status of an activation of the product unit, etc. It will be appreciated that although the activation process may be managed by the requesting system 114 or separate activation entity, in some embodiments, the product reservation system 102 or other component of the system 100 may manage and/or perform activation. According to various embodiments, each indicated inventory bin 110 may comprise only one product unit, or may comprise multiple product units. Also, in embodiments utilizing the robot 108, the robot 108 may have a plurality of assigned inventory bins 110, and may place and retrieve product units at its assigned inventory bins 110 in a manner that is transparent to the product reservation system 102. For example, the data structure 200 kept by the product reservation system 102 may simply indicate that the corresponding product unit is at an inventory bin 110 assigned to the robot 108.

The status 226 of a product unit may generally indicate whether the product unit may be used to fulfill orders. For example, a product unit may be indicated as "available" if it is in-stock and is not currently promised to an existing order. The product unit may be indicated as un-available if it is in-stock and assigned to an existing order. In various embodiments, the status 226 may indicate gradations of availability and unavailability. For example, a product unit that is assigned to an order that has not yet been confirmed or released may be indicated as reserved. If the order is confirmed (e.g., if serialized product activation was successful), then the status of the product unit may be indicated as confirmed or reserved-confirmed, while the product unit remains in-stock. If an order is released (e.g., if the serialized product activation is unsuccessful or the purchaser decides not to complete the purchase), the status 226 of the product unit may be returned to available. In various embodiments, if an order is cancelled without being released by the requesting system 114 (e.g., indicating that an internal event caused order cancellation), then the status 226 of the product unit may be indicated as quarantined until the integrity of the product unit can be confirmed. Confirming the integrity of the product unit may comprise, for example, visually inspecting the product unit, electronically scanning the product unit for physically integrity, manually or automatically verifying that the product unit is associated with the correct serial identifier at the product reservation system 102. This may prevent potentially defective or mislabeled product units from being used to fulfill future orders. According to various embodiments orders may released and/or confirmed either partially or completely. For example, a partial confirmation or release may correspond to less than all of the product units indicated by the order.

According to various embodiments, the product reservation system 102 may manage non-reserved products such as non-serialized products and non-reserved serialized products in addition to serialized products. Accordingly, the example data structure 200 may also include entries for non-serialized products 204 and non-reserved serialized products 206. Because non-serialized and non-reserved serialized products need not be uniquely delivered to end users, it may not be necessary to track unique information about each non-serialized or non-reserved serialized product unit. Accordingly, the example data structure 200 need only comprise one entry for each product type (although multiple entries for a single non-serialized or non-reserved serialized product type may be used in some circumstances). For each product type, the example data structure 200 may indicate a product name (228), a quantity of the product in-stock (230) and an inventory bin or bins 110 where units of the product are located (232). If there are multiple inventory bins 110 comprising units of the product, then a quantity of product units in each inventory bin 110 may also be indicated.

Referring back to FIG. 1, the warehouse control system 104 may manage the operations of the warehouse facility 106. For example, the warehouse control system 104 may manage the intake of new product units including, for example, new serialized product units. Intake may comprise receiving new product units and placing the product units at inventory bins 110. The warehouse control system 104 may also manage the fulfillment of confirmed product orders. Fulfillment of a confirmed order may comprise picking product units, including specific serialized product units, to complete an order. In some embodiments, fulfillment of an order may also comprise packing and/or shipping the order utilizing packing/shipping facilities 112, performing quality control, etc. The warehouse control system 104 may manage the operations of the warehouse facilities 106 in a manual automated or mixed manner. According to manual methods, product picking may be performed manually. The warehouse control system 104 may generate intake and/or pick instructions and, in various embodiments, may also receive reports of intake and/or picking progress (e.g., scans indicating product location). According to automated methods, the warehouse control system 104 may utilize the robot 108 to perform intake and/or picking. Data used to execute the functionality of the warehouse control system 104 may be stored at one or more data stores 117. The warehouse control system 104 may be comprised of various custom and/or off-the-shelf components. For example, according to various embodiments, the warehouse control system 104 may utilize a third party warehouse management system such as the RADIO BEACON product available from ACCELLOS of Colorado Springs, Colo.

In various embodiments, the product reservation system 102 and/or warehouse control system 104 may be in communication with a computerized enterprise resource planning (ERP) system 118. The ERP system 118 may be any suitable system for managing business operations including, for example, assets, inventory and accounting functions. According to various embodiments, the ERP system 118 may be in electronic communication with one or more data stores 122, storing business entity-related information. Example ERP systems are available from ORACLE, JD EDWARDS and SAP. The ERP system 118 may maintain inventory status records, but in the context of business and accounting rules. For example, the status of a product unit in the ERP system 118 may change only upon a change of the unit's business or accounting status (e.g., when a payment is owed, when physical stock is assigned to a confirmed order, etc.). Reserving a product unit for an un-confirmed order may not be such an event. Accordingly, the inventory status data maintained by the ERP system 118, may indicate that a product unit is available until the product unit is assigned to a confirmed order. In some embodiments, the ERP system 118 may also be in communication with a customer ERP system 120. The customer ERP system 120 may be implemented by a customer business entity that purchases product units from the inventory. The ERP system 118 may be in communication with the customer ERP system 120 to exchange information regarding pending and completed orders for product units from the inventory.

A maintenance interface 130 may be implemented by one or more of the systems 102 104, 106, 118 of the system 100 and may allow various users to access and maintain the various components of the system 100. According to various embodiments, the product reservation system 102, warehouse control system 104, warehouse facility 106, and ERP system 118 may be implemented by a single business distributor business entity 101 (e.g., a warehouse and distribution entity). It will be appreciated, however, that the functionalities of the components comprising the system 100 may be distributed across more or fewer business entities according to any suitable configuration. Also, according to various embodiments, all or a portion of the functionality of the product reservation system 102 and/or warehouse control system 104 may be implemented by an enterprise resource planning system, such as 118.

The requesting system 114, shown in FIG. 1, may originate orders directly or indirectly to system 100 (e.g., via the product reservation system 102, the ERP system 118, etc.). The requesting system 114 may be configured in any suitable form. For example, according to various embodiments, the requesting system 114 may comprise a software front end (such as a Web-based front end) provided by the distributor entity 101 to customers for receiving product orders. Also, according to various embodiments, the requesting system 114 may comprise a software front end (such as a Web-based front end) specific to a customer business entity, or unit thereof, for transferring product orders from the customer business entity to the product reservation system 102. For example, the product reservation system 102 may operate according to a defined communication interface. Requesting systems 114 may be designed by various parties to communicate with the product reservation system 102, the ERP system 118 or both via the defined interface. According to various embodiments, the requesting system 114 may also manage the product unit activation process, either directly or via a separate activation entity (not shown). Although only one requesting system 114 is shown, it will be appreciated that multiple requesting systems 114 may be in contact with and providing orders to the system 100 (e.g., via the product reservation system 102 and/or inventory interface system 124 shown in FIG. 4).

According to various embodiments, the requesting system 114 may be a consumer-facing interface deployed by the distributor entity 101 and/or a customer business entity or unit thereof. For example, the customer business entity, or unit thereof, may act as a retailer, selling products from the inventory through a requesting system 114 that may be branded for the customer business entity or unit. When a purchaser orders a product from the inventory, the customer business entity or unit may purchase the product from the distributor entity 101 and then re-sell the product to the purchaser. The requesting system 114 may be made available to potential purchasers according to any suitable method including, for example, via the Internet, via a kiosk present at a retail location, etc. Potential purchasers may use the requesting system 114 directly to view the inventory and place orders. When a potential purchaser views a product from the inventory, for example, the requesting system 114 may make an availability request to the product reservation system 104 and display to the potential purchaser whether the viewed item is available and, in various embodiments, how many units are in-stock. In some embodiments, the requesting system 114 may be intended for use by a clerk, employee or agent of the customer business entity. For example, a potential purchaser may come into contact with the clerk at a retail location. The clerk may facilitate the potential purchasers' order of a serialized product utilizing the requesting system 114. It will further be appreciated that, in some embodiments, the requesting system 114, as shown, may be omitted and orders may be received by the product reservation system 104 directly from a customer ERP 120. For example, the customer ERP 120, or other order originating device, may be generally referred to as the requesting system.

Figure 3:
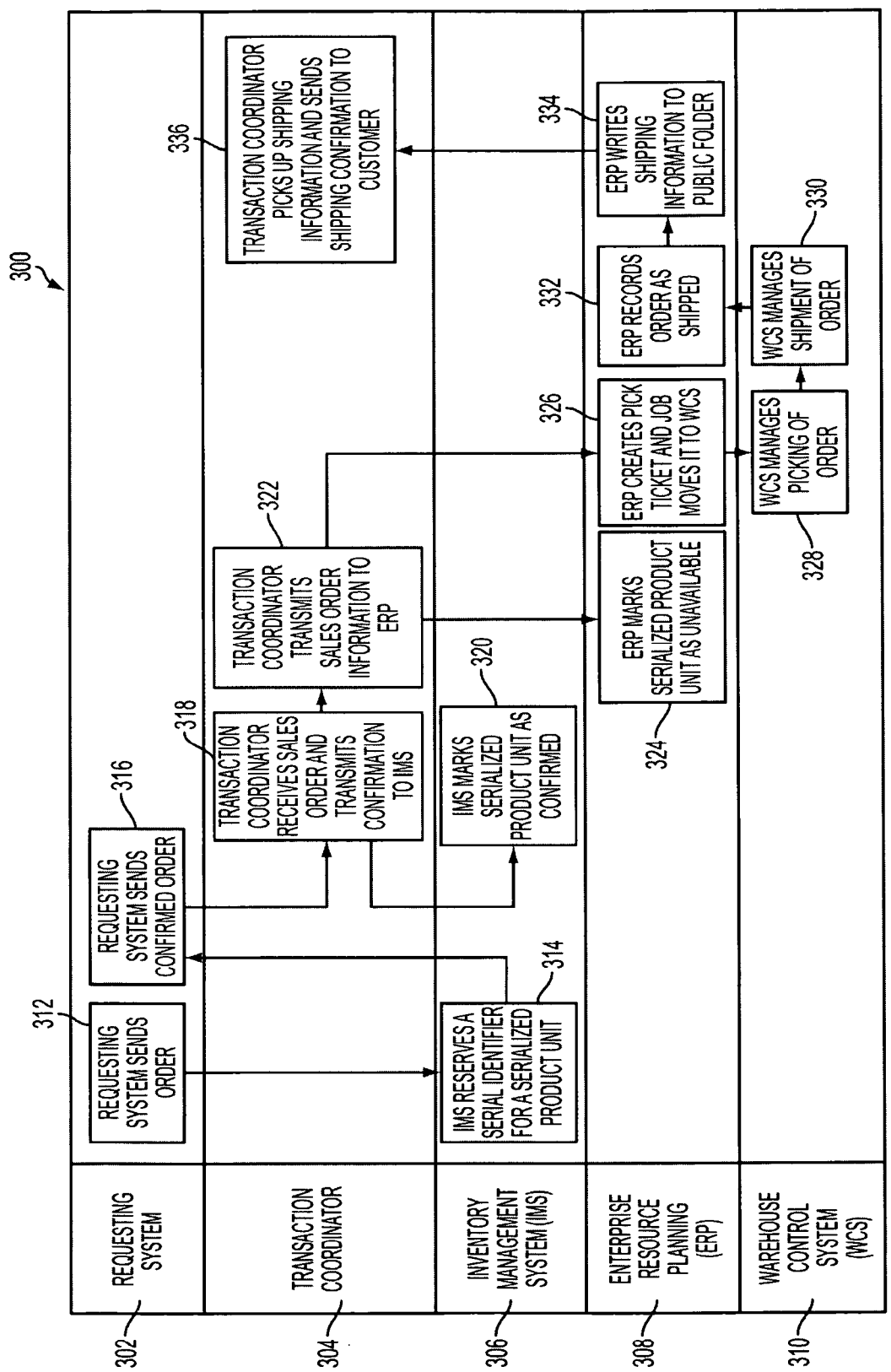
FIG. 3 illustrates one embodiment of a process flow executed by the system of FIG. 1 to receive and process an order for a serialized product.

FIG. 3 illustrates one embodiment of a process flow 300 executed by the system 100 to receive and process an order for a serialized product. The process flow 300 is illustrated with five rows 302, 304, 306, 308, 310. Each row corresponds to a component of the system 100 and actions in each row may be performed by the corresponding system component. Row 302 may comprise actions of the requesting system 114. Row 304 may comprise actions of a transaction coordinator. The transaction coordinator may be a software package executed by the product reservation system 102, the warehouse control system 104, the ERP system 118 or any other computer system to facilitate communications between the various computer systems. Row 306 may comprise actions of the product reservation system 306. Row 308 may comprise actions of the ERP system 118. In addition, row 310 may comprise actions of the warehouse control system 104. It will be appreciated that, in various embodiments, the actions shown by the process flow 300 may be performed by systems other than those indicated in FIG. 3.

At 312, the requesting system 114 may send an order to the product reservation system 102. The order may indicate at least one serialized product. The order may be received by the product reservation system 102, for example, via the transaction coordinator. In response to the order, the product reservation system 102 may identify an available unit of the indicated serialized product. The available unit may be physically located at a warehouse facility 106. Provided that a unit of the serialized product is available, the product reservation system 306 may reserve the unit at 314. For example, the product reservation system 102 may change the status of the unit from available to unavailable (e.g., at data store(s) 116). Because the product unit is not yet assigned to a confirmed order, it may still be indicated as available by the ERP system 118. An indication of the unit's serial identifier may be provided to the requesting system 114. The requesting system 114 may utilize the serial identifier to activate the reserved product unit, for example, as described herein.

According to various embodiments, the system 100 (e.g., the product reservation system 102) may comprise functionality for implementing business rules for determining whether to reserve available units of a product for an order and/or whether to indicate available products in response to an availability request. There may be circumstances where the distributor entity 101 will not reserve additional units of a serialized product, even if those units are available (e.g., in-stock and not reserved to any other orders). For example, for some products (e.g., new or popular products) different customer business entities and/or units thereof may be allocated a threshold number of product units or a limited number of product units over a given period of time. The threshold may be defined by a catalog associated with the customer business entity or unit. If an order from a customer business entity or unit exceeds the threshold number of product units, the order may be refused. Likewise, if a business entity's threshold has been exceeded, an availability request from a requesting system 114 associated with the business entity may indicate that no units are available. The thresholds assigned to different customer business entities and units may be determined according to any suitable methods. In some embodiments, thresholds may be set based on contracts between a customer business entity and the distributor entity 101 and/or based on the level of business provided to the distributor entity 101 by the customer business entity. For example, customers that regularly purchase large quantities of the inventory may be given higher thresholds. In various embodiments, customer business entities may be divided into tiers (e.g., based on historic purchase levels). Customer business entities in a common tier may have the same thresholds for one or more products. A customer business entity or unit's tier may be indicated, for example, in the entity or unit's catalog.

Additional business rules may be based on the popularity of certain products. For example, certain products may be assigned a limited sell-through rate (e.g., based on popularity). The sell-through rate may be specific to a business entity or unit, or may generally apply to all customer entities or units. In this way, the distributor entity 101 may maintain the stock of a given product despite its popularity. If an order would cause a product to exceed the desired sell-through rate, either generally or for the requesting customer business entity or unit, then it may be denied and/or delayed. Also, business rules may be based on order size. The system 100 may be configured to refuse orders specifying a number of serialized units exceeding a predetermined size. Finally, some business rules may be based on the credit rating of a customer entity or unit thereof. If a customer entity or unit does not have a certain credit level, orders from that customer entity or unit may be denied.

The requesting system 114 may send a confirmed order at 316. For example, the confirmed order may be sent if the activation of the reserved product unit is successful. In various embodiments, the confirmed order may originate from the customer ERP system 120. The transaction coordinator, at 318, may forward the confirmed order to the product reservation system 102. At 320, the product reservation system 102 may update the status of the product unit based on the confirmed order. For example, the product reservation system 102 may change the status of the order to indicate that the product unit has been reserved to a confirmed order. The transaction coordinator, at 322, may also indicate the confirmed order to the ERP system 118. At 324, the ERP system 118 may mark the product unit as unavailable. In addition, the ERP system 118 (or the product reservation system 102) may instruct the warehouse control system 104 to pick and ship the order (e.g., by generating a pick instruction or instruction as described herein). At 328, the warehouse control system 104 may manage picking of the order.

At step 330, the warehouse control system 104 may manage shipment of the order and may indicate shipment to the ERP system 118. The ERP system 118 may record the order as shipped at 332. According to various embodiments, the ERP system 118 may write shipping information (e.g., data shipped, address shipped to, etc.) to a data store (or location thereof) accessible to other components of the system 100 at 334. At 336, the shipping information may be sent as a confirmation. The confirmation may be sent by the transaction coordinator, the product reservation system 102, the ERP system 118, the warehouse control system 310 or any other suitable component of the system 100. The system 100 and process flow 300 are described with the use of a separate ERP system 118. It will be appreciated, however, that the systems and methods described herein may be practiced without an ERP system 118. For example, the functionality ascribed herein to the ERP system 118 may be performed by one or more of the product reservation system 102, the warehouse control system 104 or any other component of the system 100.

The process flow 300 illustrated in FIG. 3 shows a scenario where an order is confirmed, picked and shipped. It will be appreciated, however, that there are scenarios where an order, sent at 312, is not ultimately confirmed, picked and shipped. For example, when the requesting system 114 receives the serial identifier corresponding to the reserved product unit (e.g., after 314), it may initiate an activation of the product unit on behalf of an end user. The end user may be the purchaser or other person or entity that is the intended user of the product unit. For example, when the product is a theft-secured item, the end user may be the individual who is purchasing the product unit. Also, for example, when the product is a mobile telephone or other network device, the end user may be the individual who will use the network device. The end user may be the purchaser of the product unit or may receive it from an intermediate purchasing party (e.g., an employer). Provided that the activation is successful, the requesting system 114 may confirm the order and the process flow may continue as shown in FIG. 3. If the activation is unsuccessful, however, the requesting system 114 may send a release of the order, instead of the confirmed order. Upon receipt of the release, the product reservation system 102 may mark the status of the identified product unit as available. According to various embodiments, a product unit may be maintained in a reserved state for a limited period of time. If an order is not confirmed within the limited period of time (e.g., if the product unit remains reserved), then the product unit may be released and marked as available.

According to various embodiments, it may be possible for an order to fail during processing by the systems of the selling distributor entity 101 (e.g., at the product reservation system 102, the warehouse control system 104 and/or the warehouse facility 106). For example, the product reservation system 102 may refuse an order if no units of the ordered product are available. It is also possible for an order to fail during packing and/or shipping (e.g., if the identified product unit is damaged, etc.). For example, when an order is failed by the systems of the selling distributor entity 101, it may indicate an error associated with the product unit or units (e.g., a physical defect in the unit, an incorrectly scanned or entered serial identifier, etc.). In various embodiments, when an order fails during processing of the systems of the selling distributor entity 101, the product reservation system 102 may be configured to mark the status of the product unit or units causing the failure as quarantined. The quarantined status of a product unit may be removed upon verification of the unit's status. It will be appreciated that the communication and utilization of the unit's status may be conveyed by one or more systems in communication with the product reservation system.

The process flow 300 illustrates the handling of an order comprising a single serialized product unit. It will be appreciated that the system 100 may also handle orders that comprise multiple serialized products, non-serialized products, and/or non-reserved serialized products. In a case where the order comprises multiple serialized products, the process flow 300 may be performed similar to the manner shown in FIG. 3. Upon receiving the order, the product reservation system 102 may reserve all required product units at 314.

Provided that activation of all identified product units is successful, the requesting system 114 may confirm all serialized products in the order at 316. The remaining actions of the process flow 300 may be performed as indicated with each action being performed on each of the identified product units. In the event that one or more of the identified product units cannot be successfully activated or is otherwise cancelled, the requesting system 114 may cancel the entire order, prompting the product reservation system 102 to release all of the identified product units. Alternatively, the requesting system may send a partial confirmed order and a partial release. The product reservation system 102 may fill the portion of the order that is confirmed and release the identified product units corresponding to the partially released portion of the order.

It will also be appreciated that the order may indicate non-serialized products or non-reserved serialized products. According to various embodiments, the order may indicate whether each non-serialized or non-reserved serialized product request is conditioned upon confirmation of a serialized product request or is independent. If a request is independent, then the portion of the order corresponding to the non-serialized product or the non-reserved serialized product may be forwarded to the ERP system 118 and/or warehouse control system 104 for picking and shipping upon receipt. If the request is dependent, then it may be held until the associated serialized product request is confirmed. According to various embodiments, when an order specifies more than one product unit, it may be filled from multiple warehouse facilities 106. For example, if a first product unit from the order is only in-stock at a first warehouse facility 106 and a second product from the order is only in-stock at a second warehouse facility 106, then units of the products may be picked and shipped from the respective warehouse facilities 106 where they are in-stock.

It will be appreciated that the product reservation system 102 may comprise additional functionality as well. For example, the product reservation system 102 may respond to availability requests from the requesting system 114. The requesting system 114 may direct an availability request to the product reservation system 102. The product reservation system 102 may respond with an indication of whether units of the product are available.

According to various embodiments, the functionality attributed to the product reservation system 102, the warehouse control system 104 and the ERP system 118 may be distributed among the systems 102, 104, 118, etc., in any suitable manner. Also, although the systems 102, 104, 118, etc., are illustrated in FIG. 1 as separate systems, it will be appreciated that, in practice, these systems 102, 104, 118 may be implemented having more or fewer system components than are shown. For example, in various embodiments, the functionality of the product reservation system 102 and warehouse control system 104 may be implemented by a single computer system. Also, in various embodiments, the functionality of the product reservation system 102 and warehouse control system 104 may be distributed among more than two computer systems.

Figure 4:
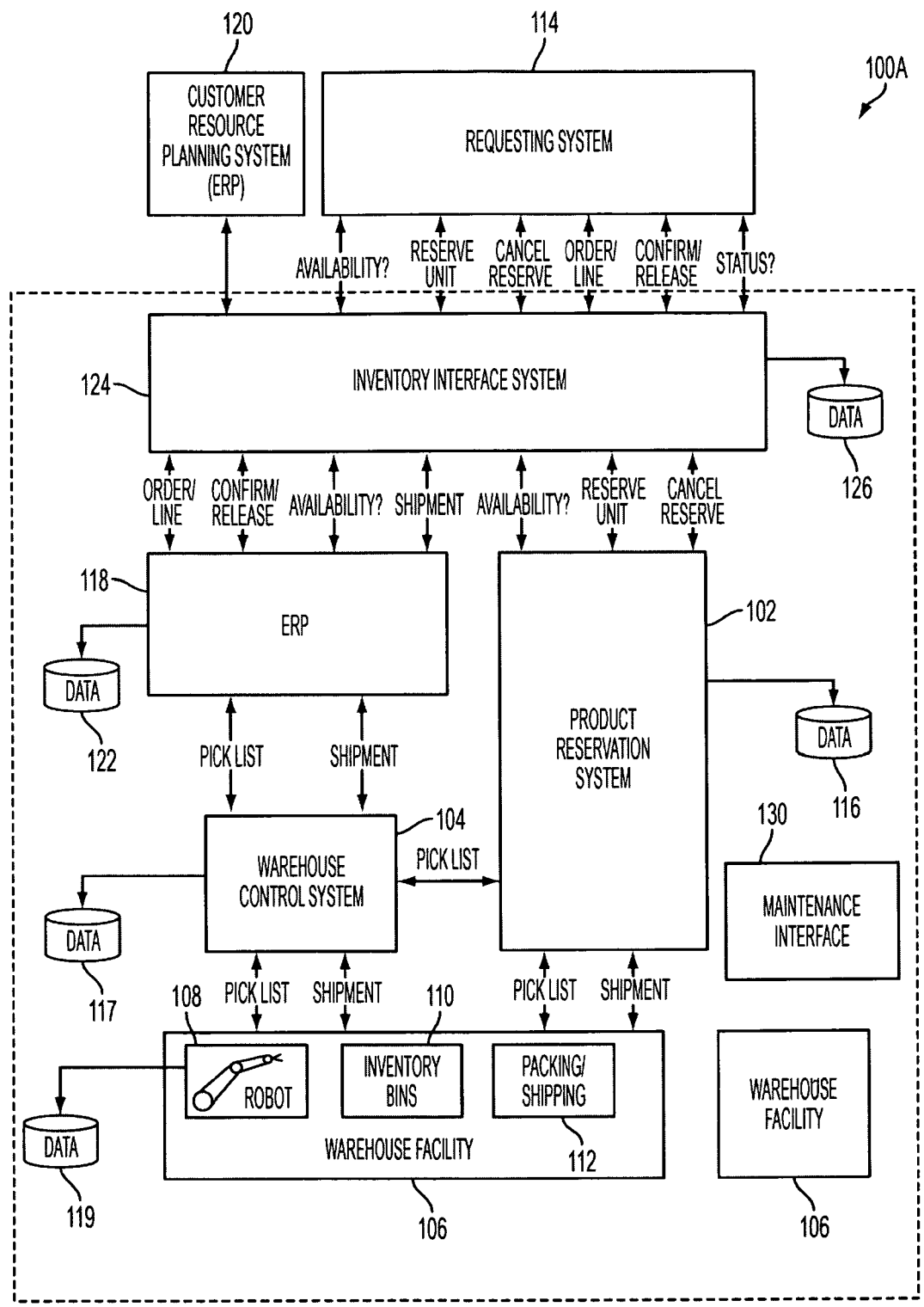
FIG. 4 illustrates an alternate embodiment of the system of FIG. 1.

FIG. 4 illustrates an alternate embodiment 100A of the system 100. The system 100A may operate in a manner similar to that of the system 100 described above, but may distribute the functionality of the system 100 among various components in a manner different from that shown in FIG. 1. For example, the system 100A may comprise an inventory interface system 124. The inventory interface system 124 may be logically positioned between customer entity systems (e.g., the requesting system 114, the customer CRP 120) and the distributor entity 101 systems (e.g., the ERP system 118, the product reservation system 102, etc.). The inventory interface system 124 may be in communication with one or more data stores 126. According to various embodiments, the inventory interface system 124 may receive orders, order confirmations, availability requests, etc., from the requesting system 114. The inventory interface system 124 may also serve as an intermediary between the customer ERP system 120 and the ERP system 118. In this way, the product reservation system 102, ERP 118 and warehouse control system 104 of the distributor entity 101 may be insulated from customer access. According to various embodiments, this may allow the system 100A to continue to receive orders and order-related information when one or more of the other system components are down (e.g., due to an error, maintenance, etc.). Also, in the system 100A illustrated in FIG. 4, the product reservation system 102 may communicate directly with systems at the warehouse facility 106, for example, to manage the fulfillment of serialized products.

Figure 4A:
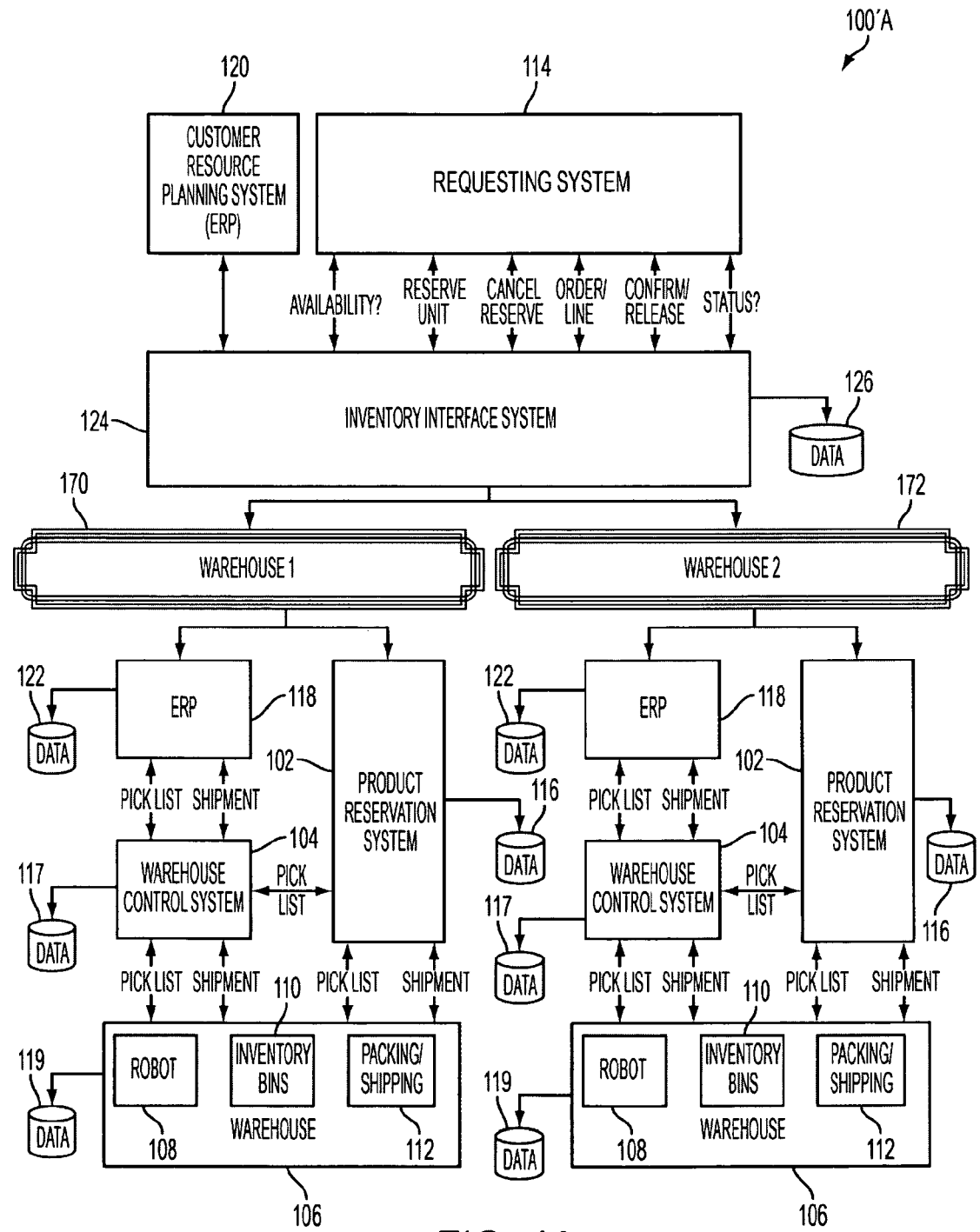
FIG. 4A illustrates another embodiment of the system of FIG. 4 comprising multiple warehouses.

As shown in FIG. 4, the system 100A may comprise more than one warehouse facility 106. In the embodiment shown in FIG. 4, a single inventory interface system 124, ERP 118, product reservation system 102 and warehouse control system 104 may be programmed to manage multiple warehouse facilities 106. For example, the inventory bins 110, packing and shipping components 112, etc. of each warehouse may be considered together by the various systems 102, 104, 118, 124. For example, each warehouse component (bin 110, robot 108, packing/shipping component 112, etc.) may have an associated location corresponding to the warehouse facility 106 where the component is present. Instructions from the various systems 102, 104, 118, 124 regarding the component may be directed to the appropriate location/warehouse facility 106. FIG. 4A illustrates another embodiment of the system 100A comprising multiple warehouses 170, 172. Each warehouse 170, 172 may comprise a separate ERP 118, product reservation system 102, warehouse control system 104 and warehouse facilities 106. A single inventory interface system 124 may manage both warehouses 170, 172. For example, the inventory interface system 124 may direct orders, or portions of orders, to the appropriate warehouse 170, 172. For example, if an order requests a product available at warehouse 170 and not at warehouse 172, the order may be directed to warehouse 170. Also, for example, if an order recites a first product available at warehouse 170 and a second product available at warehouse 172, the inventory interface system 124 may split the order accordingly.

Figure 5:
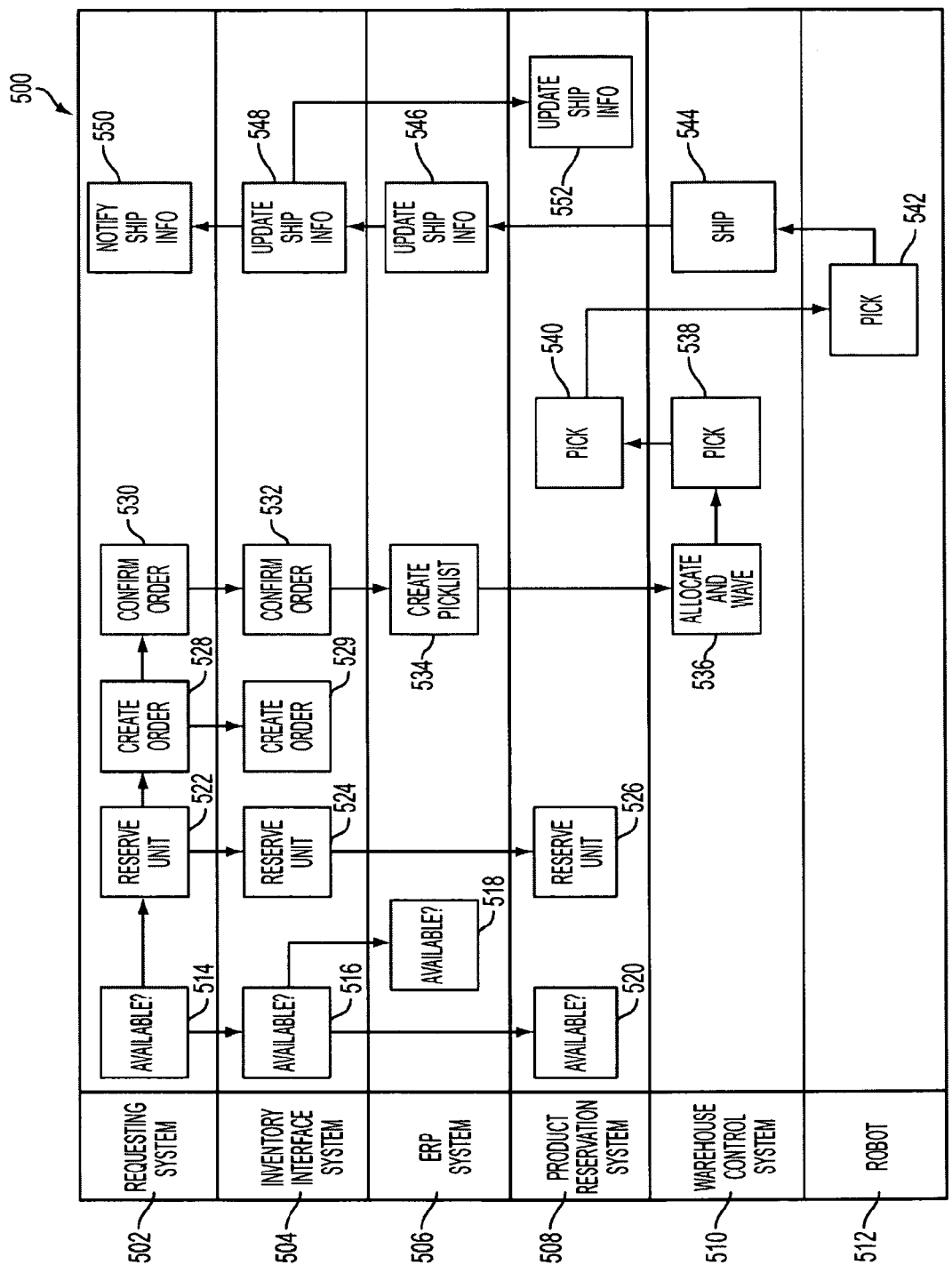
FIG. 5 illustrates one embodiment of a process flow executed by the system of FIG. 4 to receive and process an order for a serialized product.

FIG. 5 illustrates one embodiment of a process flow 100 executed by the system 100A of FIG. 4 to receive and process an order for a serialized product. The process flow 500 is illustrated with six rows 502, 504, 506, 508, 510, 512. Actions shown in row 502 may be performed by the requesting system 114. Actions shown in row 504 may be performed by the inventory interface system 504. Actions shown in row 506 may be performed by the ERP system 118. Actions shown in row 508 may be performed by the product reservation system 102. Actions shown in row 510 may be performed by the warehouse control system 510. Actions shown in row 512 may be performed by the robot 108. Although the entity performing each action of the process flow 500 is identified, it will be appreciated that the actions may be distributed among the various components and systems in any suitable way.

At 514, the requesting system 114 may generate an availability request. The availability request may be generated, for example, when a customer agent or potential purchaser requests a portion of the requesting system 114 interface corresponding to a particular product. The availability request may be received by the inventory interface system 124, at 516. In turn, the inventory interface system 124 may forward the availability request to the ERP system 118 at 518 and to the product reservation system 102 at 520. The ERP system 118 may reply to the availability request by indicating where its records show any units of the requested product in-stock. As described above, the status kept by the ERP system 118 may not account for product units that are reserved for un-confirmed orders. Therefore, availability information from the ERP system 118 may be supplemented with availability information received from the product reservation system at 520. Availability information received from the product reservation system 102 may account for reserved product units. It will be appreciated that, in various embodiments, the requesting system 114 may submit an order or request the reservation of a serialized product unit without first checking availability. If no product units are available, the requesting system 114 request may be denied.

At 522, the requesting system 114 may request that a unit of a serialized product be reserved. The inventory interface system 124 may receive the request (524) and forward it to the product reservation system 102. In response to the reservation request, the product reservation system 102 may reserve a unit of the identified serialized product (e.g., by marking a status of the selected product unit at the data store 116 as unavailable). Upon reserving the serialized product unit, the product reservation system 102 may send the serial identifier of the reserved unit to the requesting system 114 (e.g., via the inventory interface system 124). As described above, the requesting system 114 may utilize the serial identifier to, directly or indirectly, activate the reserved unit. According to various embodiments, the inventory interface system 124 may implement business rules similar to those described above in order to determine whether to reserve a product unit or units in response to the request.

At 528, the requesting system 114 may generate an order including the reserved unit, which may be received by the inventory interface system 504. For example, the order generated at 528 may indicate the serial identifier of the product unit reserved by the product reservation system 508 at 526. It will be appreciated that the order may also specify products other than the reserved serialized product unit including, for example, other serialized product units, one or more non-reserved products (e.g., non-serialized products, non-reserved serialized products, etc.). According to various embodiments, the reservation request action 522 and order creation action 528 may be performed and transmitted simultaneously (e.g., the order may serve as the reservation request). In some embodiments, the order confirmation action 532 may also occur simultaneously with the reservation request action 522 and the order creation action 528.

At 530, the requesting system 114 may confirm all or a portion of the order (e.g., if the activation of the serialized product unit is successful). The order confirmation may be provided to the ERP system 118, which may generate a fulfillment instruction or pick instruction for the order at 534. The fulfillment instruction may be provided to the warehouse control system 104, which may allocate the order to one or more inventory bins 110 and/or identify the number and type of shipping cartons to be used at 536. At 538, the warehouse control system 104 may manage the picking of non-serialized products and non-reserved serialized products, if any, that are identified by the order. At 540, the product reservation system 102 may manage the picking of serialized products, including the identified serialized product unit. For example, if the identified serialized product unit is stored at a robot accessible inventory bin, the product reservation system 102 may pick the unit by instructing the robot 108 to perform the pick (542). If the identified serialized product unit is stored at a manual serialized product bin, then the product reservation system 102 may generate a paper or electronic pick instruction that may be provided to a manual picker. According to various embodiments, the product reservation system 102 may also receive scans from the manual picker indicating, for example, the inventory bin that the unit is removed from, the unit itself, and other information related to the pick in order to verify accuracy.

At 544, picked product units for the order may be shipped. For example, the warehouse control system 104 may manage shipping-related tasks such as selecting an appropriate shipping carton or cartons, printing shipping labels and packing slips, handling quality control, etc. At 546, 548 and 552 ship information related to the order may be updated at the ERP system 118, the inventory interface system 124 and the product reservation system 102, respectively. A ship notification may be provided to the requesting system 114 at 550. It will be appreciated that the shipping process may be organized or arranged in any suitable manner. A more detailed example of the shipping process is provided below with reference to FIG. 10. Also, according to various embodiments, the system 100 and/or the system 100A may comprise a notification engine configured to provide an e-mail or other alert upon selected occurrences. For example, an alert may be sent when a order is received, when an order is confirmed, when an order is picked, when an order is shipped, etc. The recipient or recipients of the alert may include, personnel of the distributor entity 101, personnel of the customer entity, etc. Example events that may trigger an alert may include, for example, when an order becomes pending, when an order is cancelled (either by the customer entity or the distributor entity 101), when an order is entered into the ERP 118 or the customer ERP 120, when a fulfillment or pick instruction for the order is generated, when the picking of an order is completed, when an order is shipped, etc. For example, an alert sent when an order is shipped may indicate a package carrier and/or tracking number.

According to various embodiments, the system 100 (e.g., via the product reservation system 102 and/or inventory interface system 124) may organize and provide services to customers at differing levels of granularity. For example, customer business entities may be divided into customer units. Each customer unit may be provided with a dedicated catalog of products from the inventory that the customer unit may sell to purchasers. A catalog of products may comprise indications of each product from the inventory that a customer unit is authorized to sell. The content of a customer unit's catalog (including the products present, an allowable sell-through rate, a number of product units available to the customer unit, etc.), may be provided to a customer unit via the requesting system 114. The products and quantity of products available to a customer unit via the catalog may be determined, for example, based on agreements between the distributor entity 101 and the customer unit, the discretion of the distributor entity 101 and/or the customer unit etc.

Customer business entities may be divided into customer units in any suitable way. In some embodiments, a customer business entity may comprise multiple companies, with each company assigned a dedicated catalog of products from the inventory. For example, the customer business entity may be a holding company and each company organized under the customer business entity may represent a separate entity owned by the customer business entity, a separate line of business, etc. Also, according to various embodiments, one or more customer units may comprise multiple applications.

Each application may represent a different method for purchasers to purchase product items from the inventory. For example, different applications may represent different requesting systems 114, different methods of sale (e.g., on-line, in-store, telephone order, etc.). In embodiments where a customer unit comprises physical retail locations, each location may be assigned a separate location customer unit. Also, in some embodiments, physical location customer units may be divided into location/application units. For example, a first location/application unit at a physical location may be a kiosk located in a mobile telephone area of the physical location and may utilize a catalog limited to products related to mobile telephones. A second location/application unit at the physical location may be a second kiosk located in a laptop/computer area of the physical location and may utilize a catalog limited to laptop and related products.

Figure 5A:
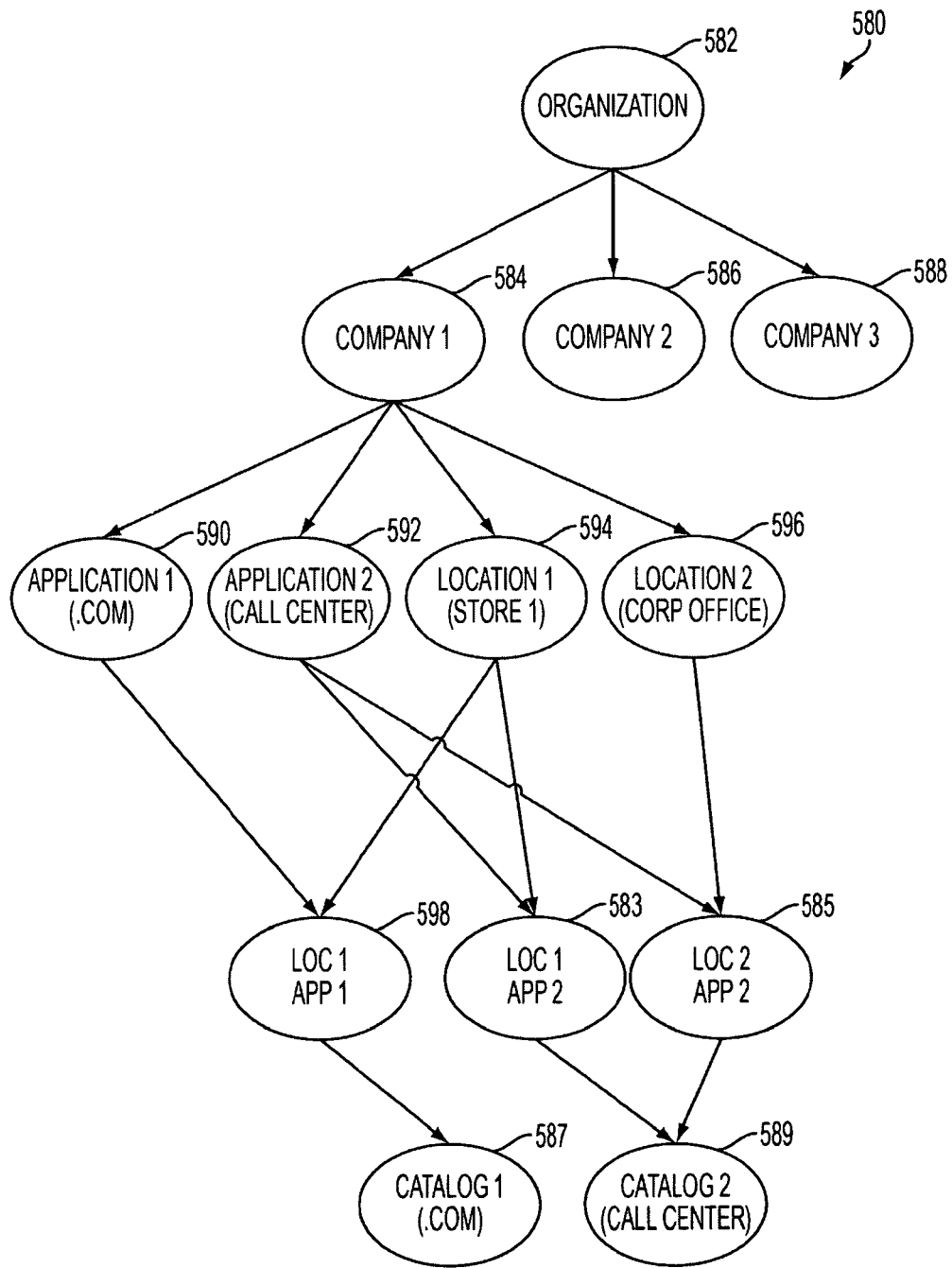
FIG. 5A is a chart illustrating one embodiment of a hierarchy of customer units.

FIG. 5A is a chart illustrating one embodiment of a hierarchy 580 of customer units. The organization 582 may correspond to a customer entity and may be the highest level customer unit. In the example shown in FIG. 5A, the organization 582 comprises three companies 584, 586, 588. Each company 584, 586, 588 may represent a company owned by the organization 582, a subsidiary of the organization 582, a business unit of the organization 582, etc. Companies 586 and 588 are shown without any sub-customer units, although these units 586, 588 may be assigned applications, locations, etc. Company 584 may comprise one or more applications and/or locations, such as shown. Application 590 may correspond to a purchaser website, which may be or may interface with a requesting system 114. Application 592 may correspond to a call center for receiving purchaser orders. For example, automatic or human operators at the call center may utilize a requesting system 114 to transmit orders to the inventory interface 124, the product reservation system 102, etc. Locations 594, 596 may correspond to different physical locations (e.g., retail stores, corporate offices, etc.). Location/Applications 598, 583, 585 may correspond to the possible combinations of locations and applications above. For example, application 592 may be supported by both locations 594 and 596. Accordingly, the hierarchy 580 may comprise two application/locations corresponding to the application 592, an application/location 583 corresponding to the combination of application 592 and location 594 and an application/location 583 corresponding to the combination of the application 592 and the location 596. Applicant 590 may only be supported at location 594 and, thus, may only have a single application/location 598 corresponding to the combination. Each application/location may be associated with a catalog 587, 589. For example, as illustrated in FIG. 5A, catalogs 587, 589 are specific to an application 590, 592. It will be appreciated, however, that location catalog constraints may also exist, bringing about a different catalog for each application/location.

According to various embodiments, each customer unit catalog may comprise a list of products making up the catalog. Catalogs may also comprise various other information about products including, for example, descriptions of products as well as product prices. Each product price may represent the price for the product charged by the customer unit to the purchasers. In embodiments where the requesting system 114 is implemented by the customer business entity (e.g., a unit of the customer business entity), catalog information such as product descriptions and product prices may be stored at systems of the customer business entity and modified by the customer business entity according to any suitable manner. In embodiments where the requesting system 114 is implemented by the business entity 101 (and some embodiments where the requesting system 114 is implemented by the customer business entity), catalog information may be stored by the product reservation system 102, the inventory interface system 124 or any other suitable component of the system 100. According to various embodiments, customer unit catalogs may be hierarchal in nature. For example, a customer entity may be assigned a catalog comprising all products that may be sold by customer units organized under the customer entity. Customer unit may add additional constraints, resulting in a unique calendar for different customer units.

Figure 5B:
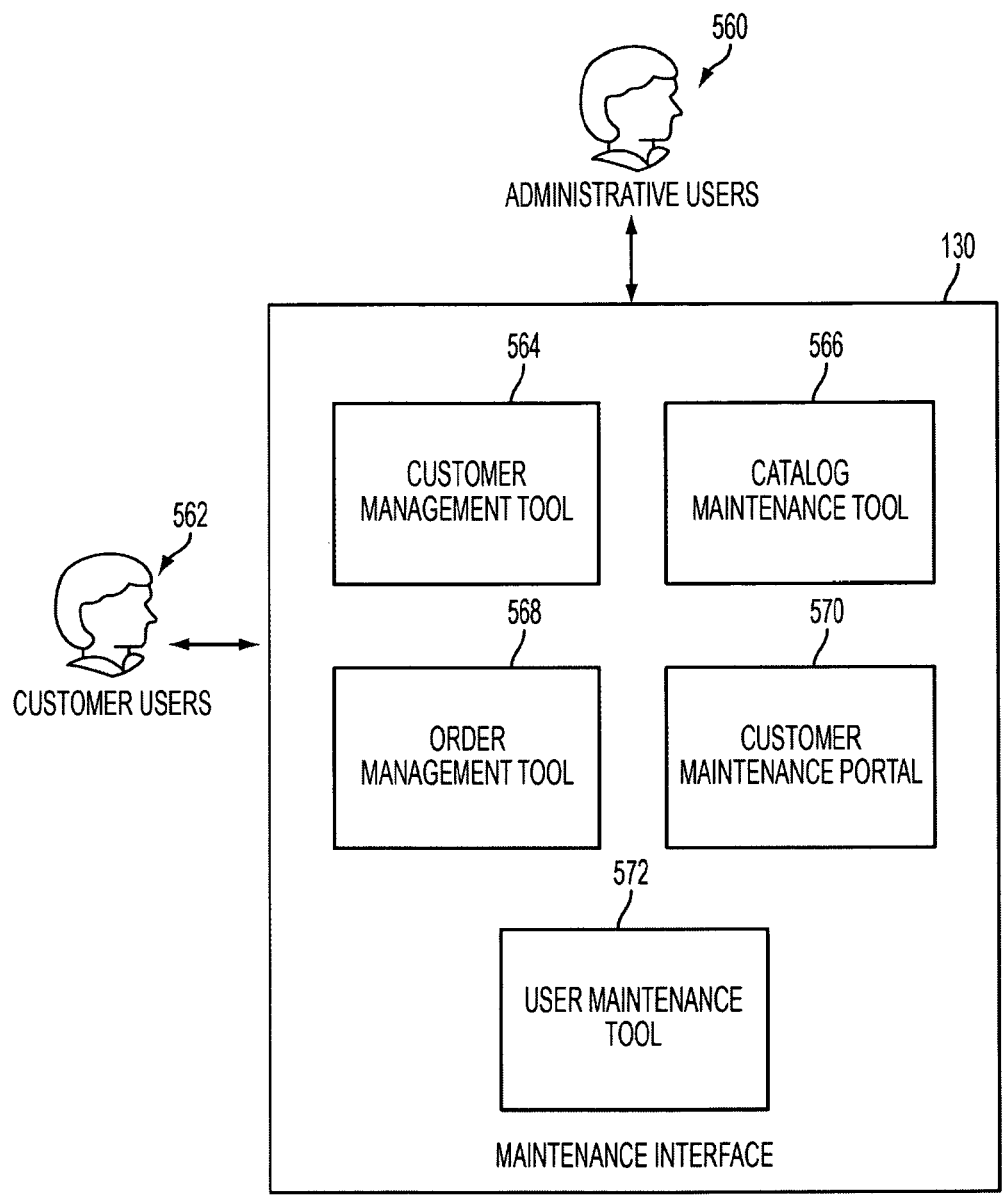
FIG. 5B illustrates a block diagram of one embodiment of the maintenance interface illustrated in FIGS. 1 and 4.

FIG. 5B illustrates a block diagram of one embodiment of the maintenance interface 130 illustrated in FIGS. 1 and 4. The maintenance interface 130 may be a user interface utilized, for example, by distributor entity 101 administrative users 560 to maintain and/or modify various aspects of the system 100, 100A. For example, the maintenance interface 130 may be configured to manage aspects of interaction between the system 100, 100A and the customer entity (e.g., via the one or more requesting systems 114). As described above, such interaction may implicate the product reservation system 102, the inventory interface system 124, the ERP 118, etc.

According to various embodiments, the maintenance interface 130 may comprise a customer management tool 564. The customer management tool 564 may provide functionality for adding, updating and changing information relating to customer business entities and component customer units as utilized by one or more of the inventory interface system 124, the product reservation system 102, the ERP system 118, etc. For example, an administrative user 560 may change information describing one or more of the customer business entities or component customer units utilizing the requesting system 114 or implementing their own requesting systems 114. Such information may include, for example, organization information describing the specific customer entity implementing or using a requesting system 114, company information describing a company that owns or operates an organization, application information describing technical details of an interface between the product reservation system 102 or inventory interface system and a requesting system 114, etc.

A catalog maintenance tool 566 may provide functionality for managing various catalogs describing the inventory. According to various embodiments, a master catalog may list all products of the inventory offered for sale. As described above, each customer business entity and/or component business unit may also have a dedicated customer catalog that lists all of the products of the inventory offered for sale to the customer entity or unit (e.g., and ultimately available for sale from the customer entity or unit to the purchasers). The catalog maintenance tool 566 may provide functionality that allows administrative users 560 to modify the master catalog or any customer unit catalogs, for example, by adding products, removing products, changing the description of products, changing the price of products (e.g., the price charged to purchasers by the customer unit), etc.

An order management tool 568 may provide functionality for managing orders placed, for example, to the inventory interface system 124 and/or the product reservation system 102 by a requesting system 114. For example, the order management tool 568 may allow administrative users 560 to view one or more orders. According to various embodiments, the order management tool 568 may include functionality for sorting orders according to any suitable criteria including, for example, by pending status. In one example, the order management tool 568 may display orders that have serialized product units that are reserved, but have not yet been confirmed. Such orders may be sorted and/or filtered, for example, by product. The order management tool 568 may also have functionality allowing administrative users to manipulate orders. For example, an administrative user 560 may be able to use the order management tool to add or cancel an order, add or cancel the reservation of a serialized product unit, etc.

A customer maintenance portal 570 may be directed to customer users 562 and may allow the customer users 562 to maintain and/or modify aspects of the interface between their customer business entities and the system 100. For example, the customer maintenance portal 750 may provide functionality allowing the customer users 562 to modify their customer unit catalog. Such modifications may include changing the price of a product (e.g., the price charged by the customer unit to the purchaser), changing the description of a product provided to a purchaser, etc.

A user maintenance tool 572 may comprise functionality for managing which users have access to different components of the maintenance interface 130. For example, an administrative user 560 may utilize the user maintenance tool to modify the access rights of other administrative users 560 as well as various customer users 572. Certain users 560, 562 may have access only to defined tools 564, 566, 568, 570, 572, or defined functionality with certain tools. Authorization of users 560, 572 may be handled by any suitable methods. Users 560, 562 may have roles that determine their access to the various tools 564, 566, 568, 570, 572. For example, customer users 562 may have a role with a customer unit or units and may, therefore, may have access limited to catalogs associated with that unit or units.

Figure 6:
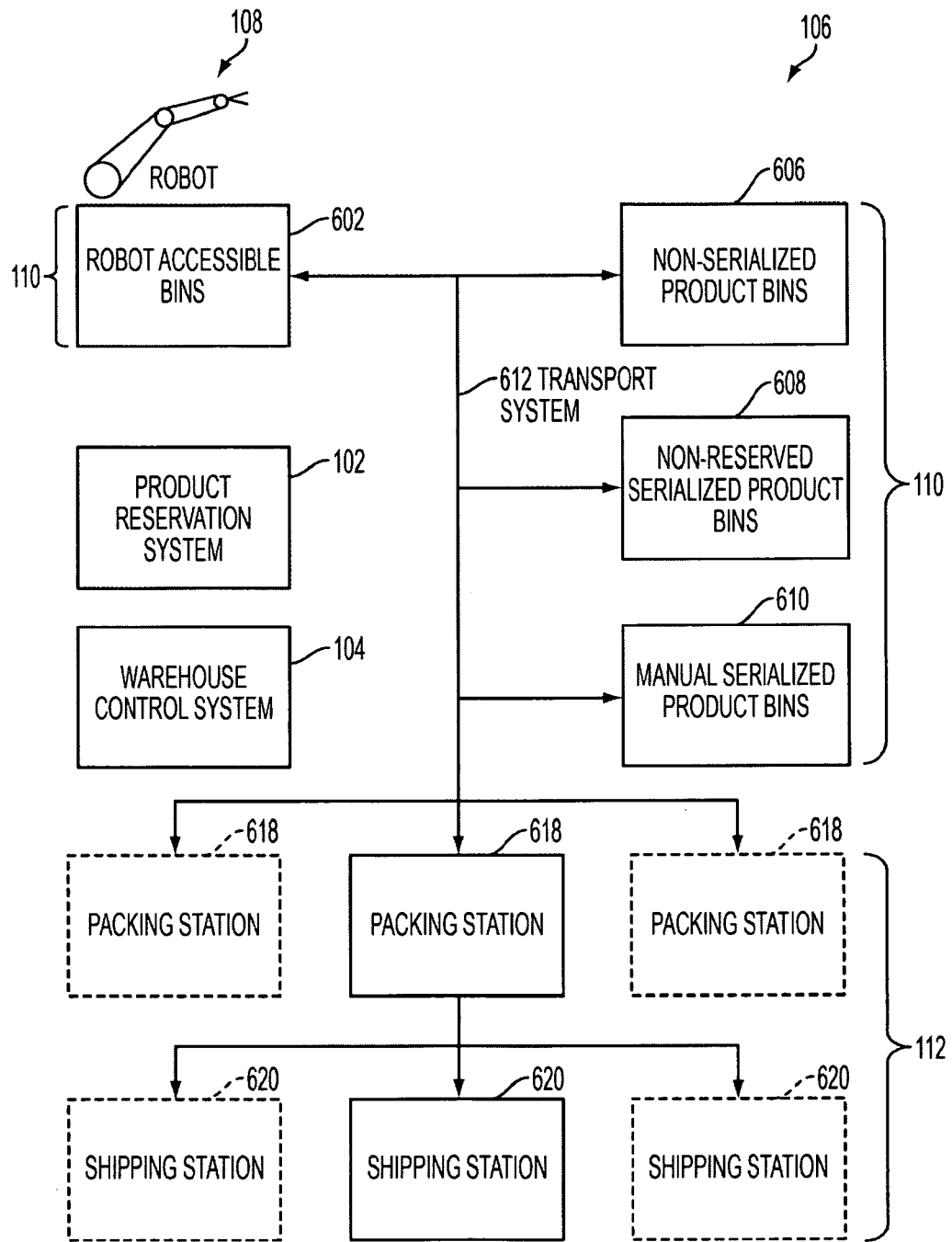
FIG. 6 illustrates a block diagram of one embodiment of the warehouse facility shown in FIG. 1.

FIG. 6 illustrates a block diagram of one embodiment of the warehouse facility 106 of FIG. 1. The facility 106 may comprise inventory bins 110, at least one robot 108, and packing/shipping stations 112. The inventory bins 110 as well as the packing and shipping stations 112 may be interconnected by a transport system 612. The transport system 612 may be any type of product transport system suitable for moving product units from one location to another. According to various embodiments, the transport system 612 may comprise one or more separate or interconnected conveyors. FIG. 6 also illustrates the warehouse control system 104 configured to manage the operation of the various other components at the warehouse facility 106. According to various embodiments, the functionality ascribed herein to the warehouse control system 104 may be performed by the product reservation system 102 or any other suitable system. For example, as described above, the picking of serialized product units may be directly managed by the product reservation system 102, as described above with reference to FIGS. 4-5.

Inventory bins 110 may comprise multiple inventory bin types, for example, based on the products that the bins are designed to store and/or the methods by which the products are designed to be picked. According to various embodiments, the inventory bins 110 may comprise robot accessible bins 602, non-serialized product bins 606, non-reserved serialized product bins 608 and manual serialized product bins 610. Product units may be placed directly at a bin or, in various embodiments, may be first placed in a tray or other intermediate container. The tray may then be placed at the bin. The tray may be any suitable container for holding the product unit.

The robot accessible bins 602 may be any kind of inventory bin that is accessible to a robot, such as robot 108. The robot 108 may be configured to place product units at the bins 602 and retrieve product units from the bins 602. According to various embodiments all or a portion of the robot accessible bins 602 may be utilized to store serialized products. The robot 108 may comprise functionality for placing and retrieving specified product units on demand. For example, each of the robot accessible bins 602 may be configured to hold a single serialized product unit. During intake, the robot 108 may place each product unit at a robot accessible bin 602. When the robot 108 is instructed to pick a particular serialized product unit, it may recall the bin 602 where the unit is stored, pick the unit from that bin 602, and place it on the transport system 612. In some embodiments, more than one serialized product unit may be stored at each bin 602. For example, the robot 108 may comprise a scanner, camera or other functionality allowing it to identify and pick an identified product unit from a location 602 comprising multiple product units. Operation of the robot 108 may be managed by the product reservation system 102 (as illustrated in FIGS. 4-5), the warehouse control system (as illustrated in FIGS. 1 and 3), or any other component of the system 100.

Manual serialized product bins 610 may comprise serialized product units stocked for manual rather than robotic picking. For example, some or all of the serialized product units stocked at the facility may be assigned to the manual serialized product bins 610. Intake of serialized product units to the bins 610 may be managed by the warehouse control system 104. For example, the warehouse control system 104 may assign each serialized product unit to a specific bin 610. According to various embodiments, multiple product units may be assigned to each bin 610. The maximum number of product units assigned to a given bin 610 may be determined to both minimize the number of bins 610 required and minimize the amount of time required for manual pickers to identify a particular product unit within a bin 610. According to various embodiments, the product bins 610 may be optimized for human placement and picking. For example, the product bins 610 may be clustered at a height that an average manual picker can reach without excessive bending or stretching. For example, the product bins 610 may be clustered between two and six feet off of the floor.

Intake and picking of the manual serialized product bins 610 are described below as being managed by the product reservation system 102 (as illustrated in FIGS. 4-5). In some embodiments, however, intake and picking of the manual serialized product bins may be managed by the warehouse control system 104 (as illustrated in FIGS. 1 and 3). During intake, bin assignments made by the product reservation system 102 may be communicated to manual pickers according to any suitable means. For example, the product reservation system 102 may generate one or more paper or electronic placement instructions. Manual pickers may receive the placement instructions, locate the indicated product unit or units and place the unit or units at a bin 610 identified by the ticket. Also, according to various embodiments, the manual pickers may be equipped with a scanning device in electronic communication with the warehouse control system 104. The manual pickers may retrieve a product unit assigned to the bins 610 and scan it with the scanning device. The scanning device may capture a unique identifier of the product unit (e.g., the serial identifier) and provide the identifier to the warehouse control system 104. The product reservation system 102 may receive the identifier, and return to the scanning device an indication of the appropriate bin 610. The scanning device may display the indication of the bin 610, which may prompt the manual picker to place the product unit at the bin 610. According to various embodiments, the manual picker may scan the bin 610 and/or the product unit after placement, which may provide to the warehouse control system 104 confirmation of the unit's location. According to various embodiments, manual pickers may initiate the placement process by scanning a product unit. The scan may be received by the product reservation system 102, which may return to the manual picker an indication of a manual serialized product bin 610 where the unit should be placed. The manual picker may subsequently place the unit at the identified bin 610.

Also, according to various embodiments, serialized product units may be placed at bins 610 according to product turn-over. For example, products having a high turn over may be stored at bins 610 located at about eye-level, for faster picking and placement. Products having lower turn-over may be stored at bins 610 that are higher or lower. According to various embodiments, prior to generating the placement instruction, the product reservation system 102 may determine an expected turn-over rate for a product. For example, products may be classified as "A," "B" and "C," with each category corresponding to a different turn-over level. The bin 610 selected by the product reservation system 102 for a given product unit may be determined based on the product turn-over rate (e.g., the products "A," "B," or "C" classification).

When a specific serialized product unit is to be picked, the product reservation system 102 may identify the bin 610 comprising the product unit. A paper or electronic pick instruction may be generated specifying the bin 610 and the serial identifier of the product unit. A manual picker may receive the pick instruction, go to the bin 610, identify the specified product unit at the bin 610, and place the specified product unit on the transport system 612. When the manual picker is equipped with a scanning device, the picker may scan one or more of the bin 610 and the product unit prior to placing the unit on the transport device 612. This may provide verification to the product reservation system 102 that the correct product unit has been picked and placed on the transport system 612.

Non-serialized product bins 606 may be any kind of inventory bin. Because it is not necessary to match specific non-serialized product units to specific orders, it may be practical to store multiple non-serialized product units in a single bin 606. The non-serialized product units may be placed into and retrieved from bins 606 according to any suitable manual or automated method. When a non-serialized product is needed for an order, the warehouse control system 104 may identify a bin 606 comprising all or a portion of the quantity required. The system 104 may then generate a paper or electronic pick instruction, that is provided to a manual picker. The manual picker may pull a product unit from the identified bin 606 and place the unit on the transport system. In some embodiments, the manual picker may scan the product unit with a scanning device prior to placing it on the transport system 612. This may provide the warehouse control system 104 with verification that a unit of the correct product has been picked. It will be appreciated that non-serialized products may also be picked from bins 606 by a robot or other automated device.

Non-reserved serialized product bins 608 may be any kind of product bins 606 and may store non-reserved serialized products, or serialized products that may not be activated prior to sale. The bins 608 may be managed by the warehouse control system 104 in a manner similar to the non-serialized product bins 606. This is because, like non-serialized product units, non-reserved serialized product units may not need to be specifically matched to a given order. Accordingly, the non-reserved serialized product bins may be configured to comprise any suitable number of product units. The product units may be manually or automatically placed to and picked from the bins 608, for example, in a manner similar to that described with respect to the non-serialized product bins 606.

Upon picking for an order, product units may be placed on the transport system 612. According to various embodiments, the warehouse control system 104 may track product units on the transport system 612. For example, product units on the transport system may comprise a computer-readable identifier that specifies one or both of a product type and a unique serial identifier (e.g., for serialized product units). Scanners or other sensors for reading the computer-readable identifiers may be positioned at known locations on the transport system 612. The scanners may sense the computer readable identifier of each product unit passing by and provide the same to the warehouse control system 104.

The warehouse control system 104 may utilize product unit tracking information to direct the transport system 612 to transport product units corresponding to a given order to a specific packing station 618. For example, the transport system 612 may have various directing devices such as, for example, movable arms, rollers oriented orthogonal to the track direction, or other mechanical devices for directing product units off of the transport system 612 and towards the specific packing station 618. Once received at a packing station 618, the product units corresponding to an order may be manually and/or automatically confirmed, packed into a shipping container, and then placed back on the transport system 612 and directed towards a shipping station. At the shipping station 620, the shipping container may be manually or automatically addressed and appropriate postage or shipping payment information may be affixed thereto. The package may then be provided to a shipping provider for shipment.

It will be appreciated that not all warehouse facilities of the system 100 may comprise all of the inventory bin types 602, 606, 608, 610 shown at the warehouse facility 106 in FIG. 6. For example, some warehouse facilities may only have one kind of serialized product bins (e.g., manual 610 or robot accessible 602). Some warehouse facilities may lack one or more of the serialized product bins 602, 610, non-serialized product bins 606 or non-reserved serialized product bins 608. For example, it is possible that all products in the inventory may be serialized products (e.g., when serialized products are used for theft prevention). Also, it will be appreciated that some warehouse facilities may include inventory bin types in addition to those shown in FIG. 6.

The process of picking product units for an order may generally be referred to fulfilling the order. In various embodiments, however, order fulfillment may encompass more than just unit picking including, for example, shipping, quality control etc. The order fulfillment process may be managed by one or more different components of the system 100. For example, although various actions related to fulfillment are indicated herein to be initiated by the warehouse control system 104 and the product reservation system 102, respectively, it will be appreciated that any of the actions herein may managed by any component of the system 100.

Figure 7:
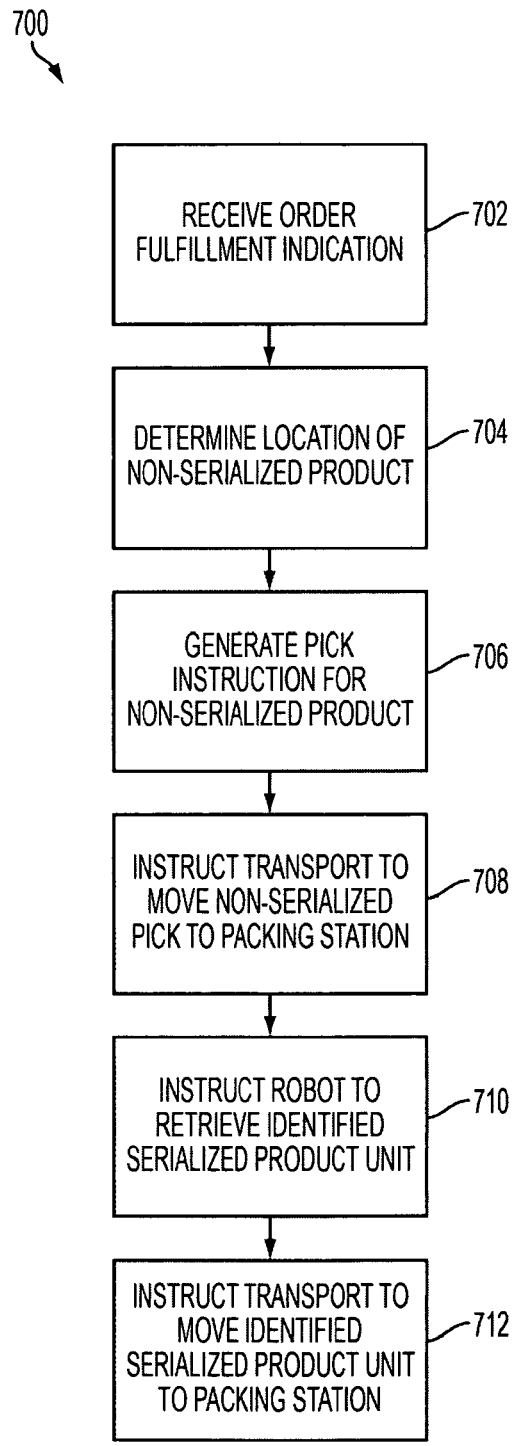
FIG. 7 illustrates one embodiment of a process flow that may be executed by the warehouse control system shown in FIG. 1 to fulfill an order specifying at least a non-serialized product and at least one serialized product stored at a robot-accessible bin.

FIG. 7 illustrates one embodiment of a process flow 700 that may be executed by the product reservation system 102 and/or the warehouse control system 104 to fulfill an order specifying at least one non-serialized product and at least one serialized product stored at a robot-accessible bin 602. At 702, the product reservation system 102 may receive an indication that the order is ready for fulfillment. The fulfillment indication may be received from the product reservation system 102, the ERP system 118, and/or the inventory interface system 124. The order may have been confirmed by the requesting system 114 prior to the fulfillment indication. Accordingly, the order and/or the fulfillment indication may specify a first unique product unit (e.g., by a unique serial identifier). In addition, the order and/or the fulfillment indication may specify at least one of a first non-serialized product.

The product reservation system 102 may, at 704, determine a non-serialized product bin 606 that contains units of the non-serialized product specified by the order. At 706, the product reservation system 102 may generate a pick or fulfillment instruction for the non-serialized product. The pick instruction may initiate a manual or automated pick from the identified non-serialized product bin 606. For a manual pick, the fulfillment instruction may be provided in paper or electronic for to a manual picker. The instruction may indicate a unit quantity of the non-serialized product to be picked, as well as the identified bin 606. The manual picker may pick the indicated unit quantity from the bin 606 and place it on the transport system 612. For an automated pick, the fulfillment instruction may be provided to a robot or other automated picking device, which may cause the indicated unit quantity from the bin 606 to be placed on the transport system 612. According to various embodiments, the product reservation system 102 or warehouse control system 102 may receive an indication when the indicated quantity of the non-serialized product is placed on the transport system 612. For example, a manual picker may utilize a scanning device to scan the indicated quantity before placing it on the transport system 612. Also, for example, the transport system 612 may comprise one or more sensors for sensing the presence of the indicated quantity of the non-serialized product on the transport system 612. The product reservation system 102 and/or the warehouse control system 104 may, at 708, instruct the transport system 612 to transport the indicated quantity of the serialized product to a selected packing station 618. For example, when the indicated quantity passes within a predetermined proximity of the packing station 618, a directing device may be deployed to push the quantity to the packing station 618, either collectively or one at a time.

At 710, the product reservation system 102 may instruct the robot 108 to retrieve the identified serialized product unit from the robot accessible bins 602. According to various embodiments, the instruction to the robot 108 may indicate the serialized product unit (e.g., by its unique serial identifier). The robot 108 may locate the bin 602 comprising the serialized product unit, pull the serialized product unit from the bin 602 and place it on the transport system 612. In some embodiments, the product reservation system 102 may provide the robot 108 with the bin 602 containing the identified product unit in addition to or instead of its serial identifier. The product reservation system 102 and/or the warehouse control system 104 may additionally instruct the transport system 612 to move the picked serialized product unit to the packing station 618, which may be the same packing station that the non-serialized product was sent to. Subsequently, the warehouse control system 104 may manage the shipping of the order, for example, as described herein.

Figure 8:
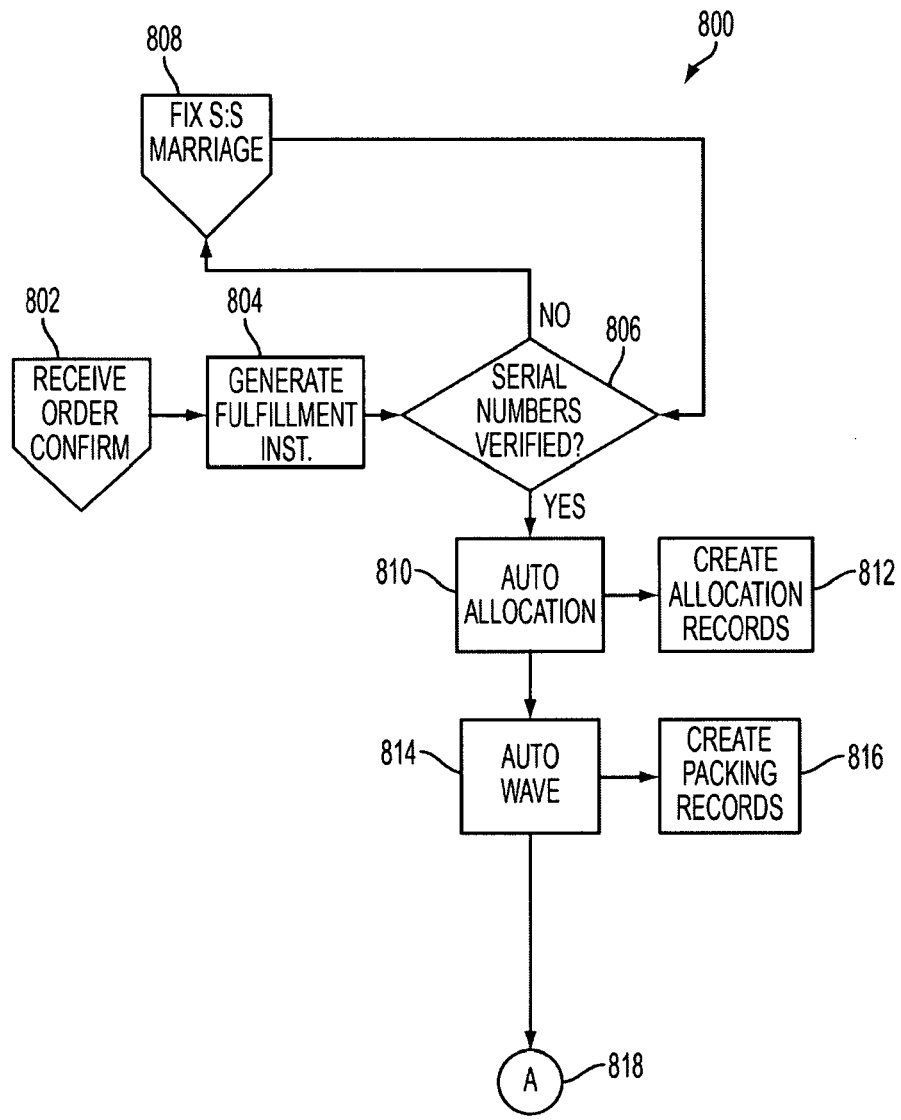
FIGS. 8, 9 and 10 illustrate one embodiment of a generalized process flow for fulfilling orders at a warehouse facility or facilities that comprise robot accessible bins, non-serialized product bins, non-reserved serialized product bins and manual serialized product bins.
Figure 9:
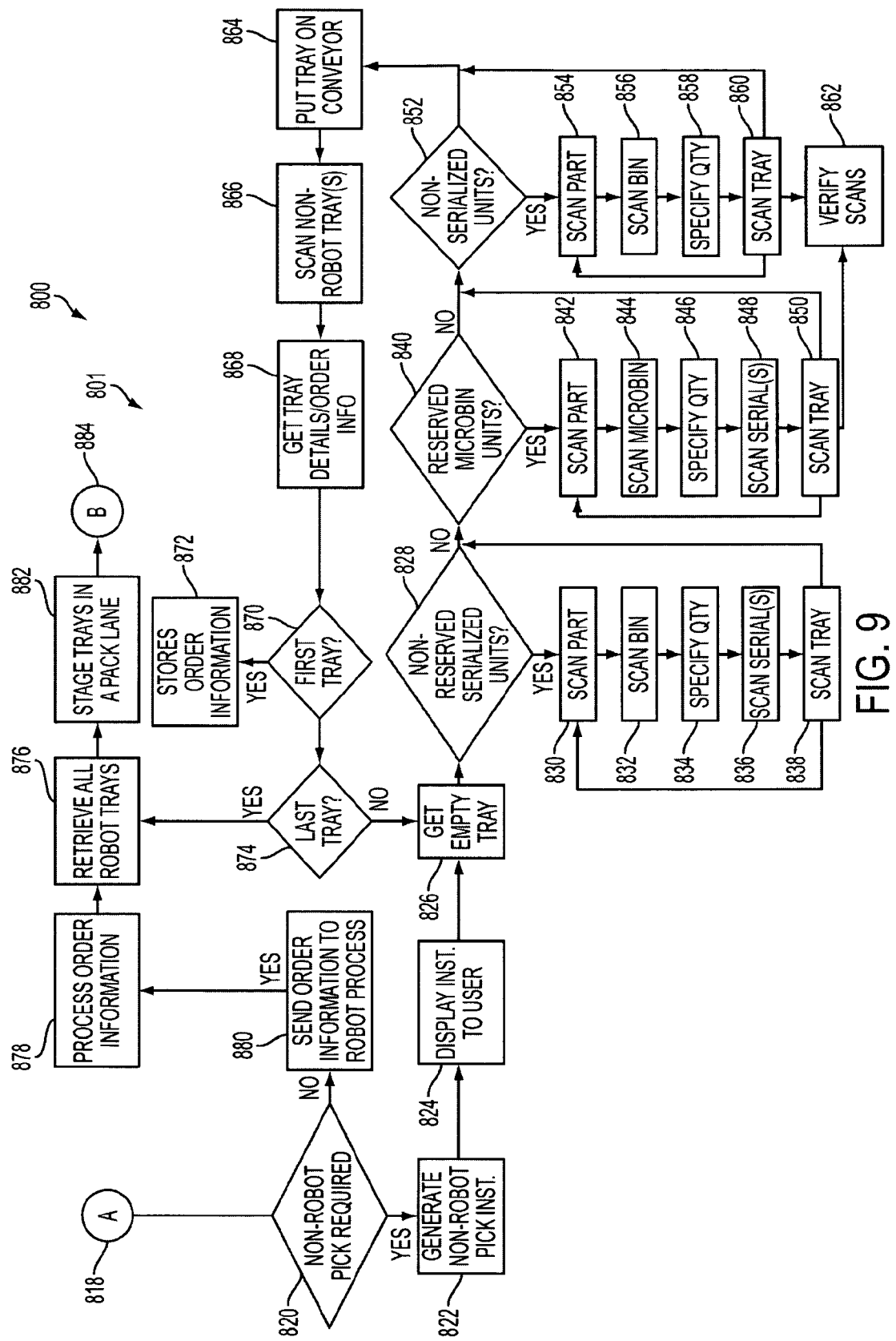
Figure 10:
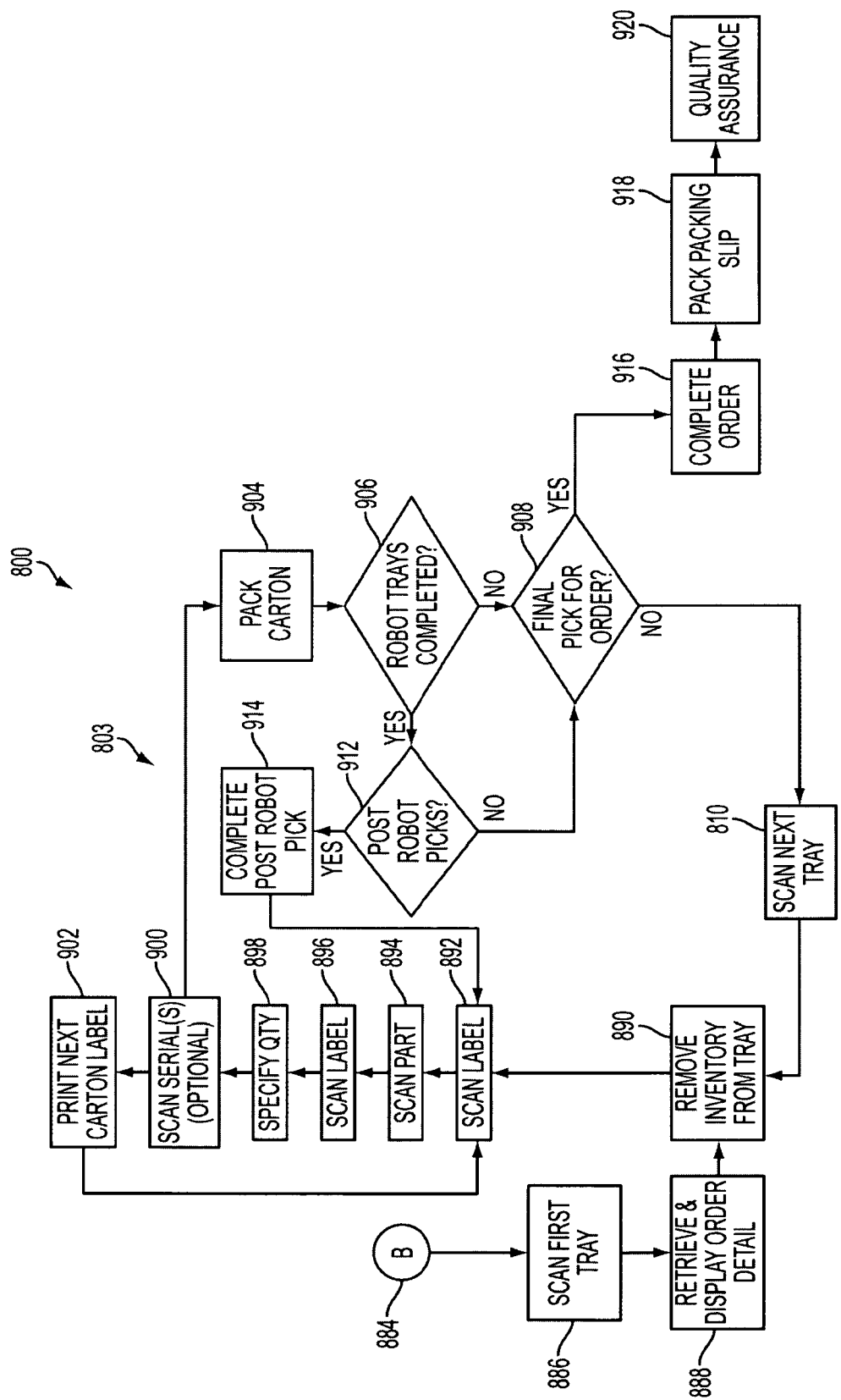

FIGS. 8, 9 and 10 illustrate one embodiment of a generalized process flow 800 for fulfilling orders at one or more warehouse facilities 106 that comprise robot accessible bins 602, non-serialized product bins 606, non-reserved serialized product bins 608 and manual serialized product bins 610. It will be appreciated that the process flow 800 may be adapted to handle one or more warehouse facilities 106 that comprise additional bin-types as well as those that contain less than all of the bin-types 602, 606, 608, 610. For example, to omit a bin-type, the process actions related to the bin-type to be omitted may not be performed. Also, the description of the process flow 800 provided below may indicate that certain actions are performed by manual actors and/or components of the system 100. These are examples only and that various actions of the process flow 800 may alternatively be performed by other components. Also, although certain actions of the process flow 600 are indicated to be performed by specific components of the system 100, it will be appreciated that the functionality described by the process flow 600 may be distributed among components of the system 100 in any suitable way.

Referring now to FIG. 8, the product reservation system 102 and/or warehouse control system 104 may receive an order confirmation at 802. The order confirmation may indicate that all or a portion of an order received from the requesting system 114 is confirmed and ready to be fulfilled. Receiving the order confirmation may be the equivalent of receiving the order fulfillment indication at 702 above. At 804, the product reservation system 102 and/or the warehouse control system 104 may generate an order fulfillment instruction. The order fulfillment instruction may indicate, for example, all products to be picked for the order, which may include, for example, serialized products, non-serialized products, and/or non-reserved serialized products. The order fulfillment instruction may have a line or entry for each unit of a serialized product specified by the original order. For example, if an order specifies three units of a first serialized product and one unit of a second serialized product, then the order fulfillment instruction may comprise three entries for the first serialized product and one entry for the second serialized product. The order fulfillment instruction may also comprise a line or entry for non-serialized product and each non-reserved serialized product from the order. Each serialized product unit entry in the order fulfillment instruction may comprise an indication of the unique serial identifier of a product unit associated with the line.

At 806, the product reservation system 102 and/or the warehouse control system 104 may determine if all serialized product unit entries of the order fulfillment instruction are properly associated with a unique product unit (e.g., via a unique serial identifier). If there is a problem with the association between a serialized product unit entry on the order fulfillment instruction and a unique serial identifier, it may be addressed at 808. Addressing such a problem may include, for example, correcting a typographical error, retrieving and adding to the order fulfillment instruction a serial identifier that was originally omitted, reserving a new serialized product item and transmitting its serial identifier to the requesting system 114 for activation, etc.

Provided that all serialized product units identified by the order fulfillment instruction are verified, the product reservation system 102 and/or the warehouse control system 104 may allocate to each order fulfillment instruction entry a bin from which the identified unit or units will be picked. For example, each entry of the order fulfillment instruction may be allocated to an inventory bin 110. The allocated bin for an entry may be written to the entry. Serialized product unit entries at the order fulfillment instruction may be allocated to either a robot-accessible bin 602 or a manual serialized product bin 610, depending on the location of the identified unit. Non-serialized product entries may be allocated to non-serialized product bins 606, and non-reserved serialized product entries may be allocated to non-reserved serialized product bins 608. It will be appreciated that non-serialized product entries and non-reserved serialized product entries may be allocated to multiple bins. For example, if a single bin includes fewer units than the quantity indicated by an entry, the entry may be allocated to more than one bin. A record of the allocation may be generated at 812. Also, in some embodiments, the allocation of 810 may comprise assigning an order fulfillment instruction entry to a tray for picking. For example, it will be appreciated that, depending on size and other factors, multiple product units may be placed in a single tray for picking and shipping.

At 814, the product reservation system 102 and/or the warehouse control system 104 may derive a packing method for the order fulfillment instruction. The packing method may specify details describing how the products identified by the fulfillment order will be shipped including, for example, the number of cartons into which the order will divided, the product units that will be in each package, the method of shipping, etc. A record of the determined packing method may be generated at 816. Place holder 818 shows how the process flow 800 transitions from the actions shown at FIG. 8 to the actions shown at FIG. 9.

FIG. 9 illustrates one embodiment of a portion 801 of the process flow 800 for picking products identified by the order fulfillment instruction. At 820, the product reservation system 102 and/or the warehouse control system 104 may determine if a non-robot pick is required to meet the order fulfillment instruction. For example, if the instruction has an entry with a product unit not corresponding to a robot accessible bin 602, then a non-robot pick may be required. Provided that a non-robot pick is required, the product reservation system 102 and/or the warehouse control system 104 may generate a non-robot pick instruction at 822. For example, a portion of the non-robot pick instruction corresponding to manual serialized product bins may be generated by the product reservation system 102, while a portion of the non-robot pick instruction corresponding to non-serialized products or non-reserved serialized products may be generated by the warehouse control system 104 (as illustrated in FIGS. 4-5). According to various embodiments, multiple non-robot pick instructions may be generated with one corresponding to serialized products and one corresponding to non-serialized and non-reserved serialized products. The non-robot pick instruction may be a paper or electronic indication of each product or product unit having an entry in the order fulfillment instruction that has been allocated to a non-robot inventory bin. According to various embodiments, the non-robot pick instruction may also comprise an assignment of the non-robot product units to one or more trays for picking. The non-robot pick instruction may be displayed to a manual picker at 824.

At 826, the manual picker may obtain a first empty tray. At 828, it may be determined if the non-robot pick instruction recites any non-reserved serialized units assigned to the first tray. If so, the manual picker may perform actions 830, 832, 834, 836, 838 for some or all of the non-reserved serialized product units identified by the non-robot pick instruction. At 830, the manual picker may scan a first non-reserved serialized product-type. For example, each inventory bin may comprise an indication of the product-type stored therein. Scanning the non-reserved serialized product-type may involve scanning this indication on the inventory bin. At 832, the manual picker may scan the inventory bin (e.g. a non-reserved serialized product bin 608) from which the product unit was picked. At 834, the manual picker may indicate the quantity of non-reserved serialized units picked from the bin. At 836, the manual picker may scan the serial identifiers of each picked product unit. All picked product units may be placed in the first tray, which may be scanned at 838. The information scanned at 830, 832, 834 and 838 may be provided to the warehouse control system to verify the accuracy of the pick at 862. If additional non-reserved serialized are indicated by the non-robot pick instruction as being allocated to the first tray, actions 830, 832, 834, 836 and 838 may be repeated for each additional unit.

At 840, it may be determined if the non-robot pick instruction recites any manual-pick serialized product units assigned to the first tray. If so, actions 842, 844, 846, 848 and 850 may be performed for each recited serialized product unit. At 842, the manual picker may scan the part type corresponding to a first recited serialized product unit. At 844, the manual picker may scan the manual serialized bin 610 indicated by the non-robot pick instruction to contain the identified serialized product unit. At 846, the manual picker may specify the quantity of units to be picked, which will often be one. At 848, the manual picker may scan the serial identifier of the unit. The manual picker may then place the identified serialized product unit in the first tray and scan the first tray at 850. The information obtained at 842, 844, 846, 848 and 850 may be provided to the product reservation system 102 and/or the warehouse control system 104 to verify the accuracy of the pick at 862. If the non-robot pick instruction indicates that an additional manual serialized product units are allocated to the first tray, actions 842, 844, 846, 848, 850 may be repeated for each additional unit.

At 852, it may be determined if the non-robot pick instruction recites any non-serialized products. If so, the manual picker may perform actions 854, 856, 858 and 860 for each product. At 854, the manual picker may scan a product-type identifier for the product. At 856, the manual picker may scan the inventory bin or bins identified by the non-robot pick instruction as including the specified non-serialized product units. At 858, the manual picker may specify the quantity of units picked and placed in the first tray. At 860, the manual picker may place the units in the first tray and scan the first tray. Again, the information obtained from the scans at 854, 846, 858, 860 may be provided to the warehouse control system 104 to verify the accuracy of the pick at 862. If the non-robot pick instruction specifies additional non-serialized units to be included in the first tray, actions 854, 856, 858, 860 may be repeated for each additional product.

When all product units assigned by the non-robot pick instruction to the first tray are placed in the first tray, the first tray may be placed on the transport system 612, at 864. After placement on the transport system 612, the first tray may be manually or automatically scanned at 866. This may provide the warehouse control system 104 with an indication of a location of the first tray on the transport system 612. At 868, the warehouse control system 104 may refer to the non-robot pick instruction to pull details describing the scanned tray. If the scanned tray is the first tray associated with the order fulfillment instruction (870), then the warehouse control system 104 may store, at 872, an indication that picking of the order has begun. If the scanned tray is not the last tray associated with the non-robot pick instruction (874), then an additional empty tray may be pulled at 826 and the process may repeat. If the scanned tray is the last tray associated with the non-robot pick instruction (874), then the warehouse control system 104 and/or the product reservation system 102 may instruct the robot 108 to retrieve all serialized product units having entries in the order fulfillment instruction that indicate robot accessible bins (e.g., a robot pick instruction). According to various embodiments, each product unit may be stored at the robot accessible bins in a tray. To retrieve a product unit, the robot 108 may retrieve the associated tray and place it on the transport system. At 882, the warehouse control system 104 may instruct the transport system 612 to direct all of the trays associated with the order fulfillment instruction to one or more packing stations. Circle 884 indicates a transition to a portion of the process flow 800 shown in FIG. 10.

Referring back to 820, if the order fulfillment instruction recites only robot picks, then the product reservation system 102 and/or the warehouse control system 104 may send a robot pick instruction to the robot 108 at 880. The robot 108 may process the robot pick instruction at 878, and retrieve all product units indicated by the robot pick instruction at 876.

FIG. 10 illustrates one embodiment of a portion 803 of the process flow 800 illustrating the packing and shipping of an order. Recall that at 882, all of the trays associated with the order fulfillment instruction were staged at one or more packing stations. At 886, the first tray associated with the order fulfillment instruction may be scanned. The order fulfillment instruction may be retrieved and, in manual embodiments, displayed to a manual packer at 888. At 889, product units may be removed from the first tray one at a time. Actions 892, 894, 896, and 900 may be performed for each non-serialized or non-reserved serialized product and for each serialized product unit in the first tray. At 892, a carton label corresponding to the shipping carton that will contain the product unit may be scanned. At 894, a part-type of the unit may be scanned. At 896, the label may be scanned again. At 898, the quantity of the product may be indicated. At 900, the serial identifier may be scanned (e.g., if the product is serialized). If an additional shipping carton is required, an additional shipping carton label may be generated at 902.

Once all of the units assigned by the order fulfillment instruction to the first carton have been scanned, the first carton may be packed at 904. According to various embodiments, order and/or product item customization may also be performed prior to or during packing. For example, when the product item is a piece of hardware, customization may comprise loading one or more software applications to the hardware. Customization may also comprise the addition of customer entity and/or product specific marketing materials, instructions, etc. The product reservation system 102 and/or the warehouse control system 104 may determine if any additional robot trays remain (906). If so, it may be determined if any post-robot picks are required (912). A post-robot pick may be a pick of an often non-serialized product that may be located in the shipping area. Products for post-robot picking may include, for example, brochures, promotional products, etc. If a post-robot pick is required, it may be performed at 914. The post-robot pick may be processed for packing at actions 892, 894, 896, 898 and 900 as described. If no post-robot pick is necessary (912), or if not all robot trays are completed (906), then the warehouse control system 908 may determine if additional trays from the order fulfillment instruction remain unprocessed (908). If so, at 910, the next tray may be scanned and then processed as described above.

If no additional trays remain, then the warehouse control system 104 may complete the order at 916. Completing the order may comprise sending an indication to the product reservation system 102 and/or the ERP system 118 indicating that the order has been picked and packed. At 918, the warehouse control system 104 may cause a packing slip to be printed and affixed to each carton corresponding to the order. Suitable quality assurance actions may be taken at 920. For example, each carton, or a sampling of cartons, may be opened and its contents verified. It will be appreciated that although various actions described with reference to the process flow 800 shown in FIGS. 8, 9 and 10 are performed by manual pickers, these actions may also be automated, for example, utilizing one or more robots.

Figure 11:
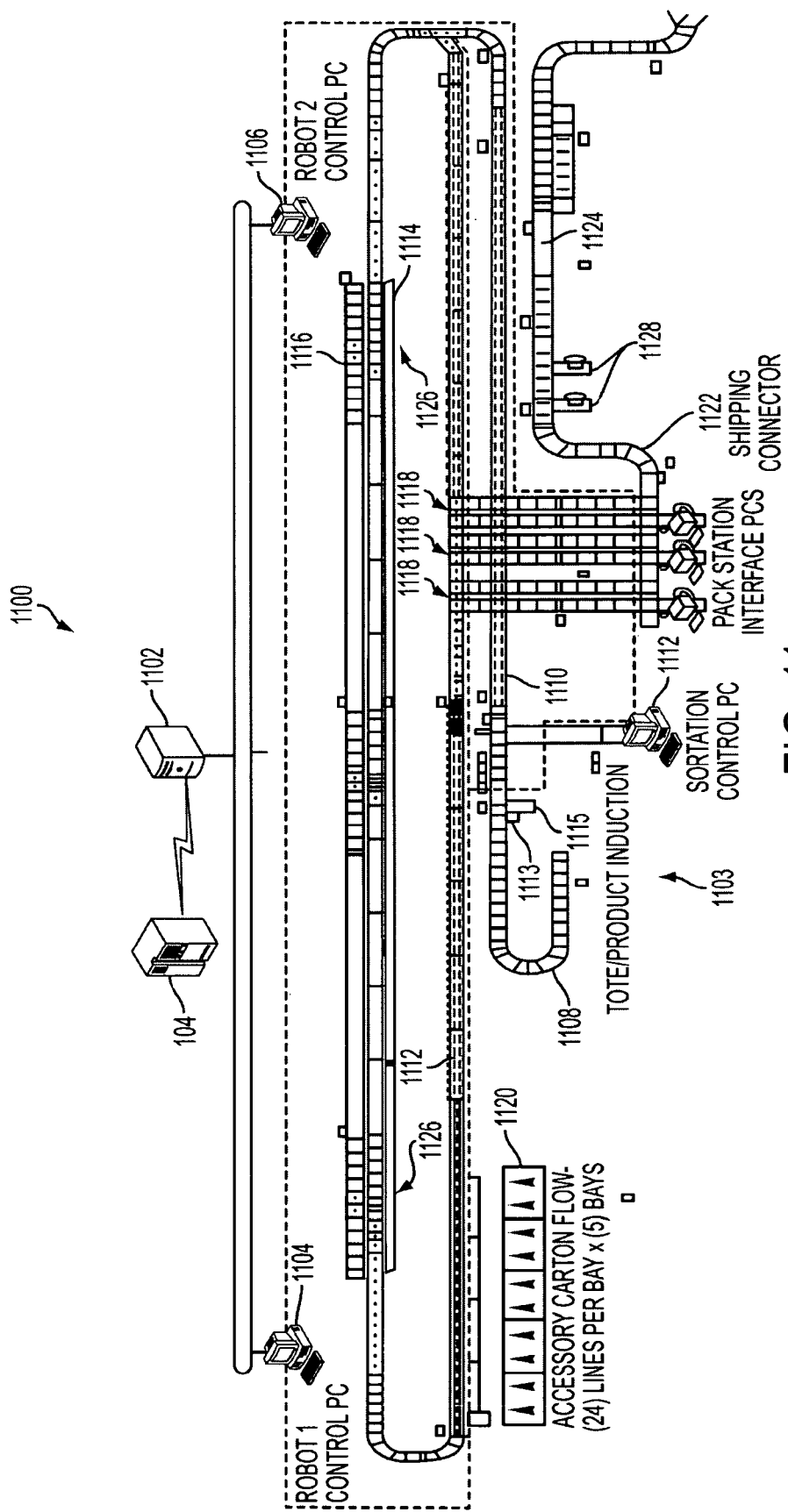
FIG. 11 illustrates a block diagram of one embodiment of a floor area of a warehouse facility comprising a robotic picking line.

FIG. 11 illustrates a block diagram of one embodiment of a floor area 1100 of a warehouse facility 106 comprising a robotic picking line. The floor area 1100 may comprise robot accessible bin units 1114, 1116, each comprising robot accessible bins. One or more robot arms 1126 may be positioned and configured to place product units to and pick product units from the robot accessible bins. Although the robot implementation shown in FIG. 11 comprises robot arms 1126, it will be appreciated that any suitable automated picking device may be used. An intake station 1103 may receive serialized product items to be placed by the robot arms 1126. The floor area 1100 may also comprise packing stations 1118 and shipping stations 1128. An intake product transport system 1108, an intake transport system 1110, an intermediate transport system 1112 and a outflow transport system 1122 may collectively make up the transport system 612 for transporting products among the robot-accessible bin units 1114, 1116, packing stations 1118, and shipping stations 1128. Input stations 1120 may be positioned proximate the product transport system 1110 and may be configured to receive picked product units from non-robot inventory bins. Operation of the floor area 1100 may be managed by one or more computer systems. For example, the warehouse control system 104 may generally direct the operation of the floor area 1100 as described herein above. The operation of the robot arms 1126 may also be controlled by one or more computer systems. For example, a robot control system 1102 may direct the robot arms 1126. According to various embodiments, each robot arm 1126 may comprise an arm-specific computer system 1104, 1106, for example, to control fine motions of the arms 1126.

Figure 12:
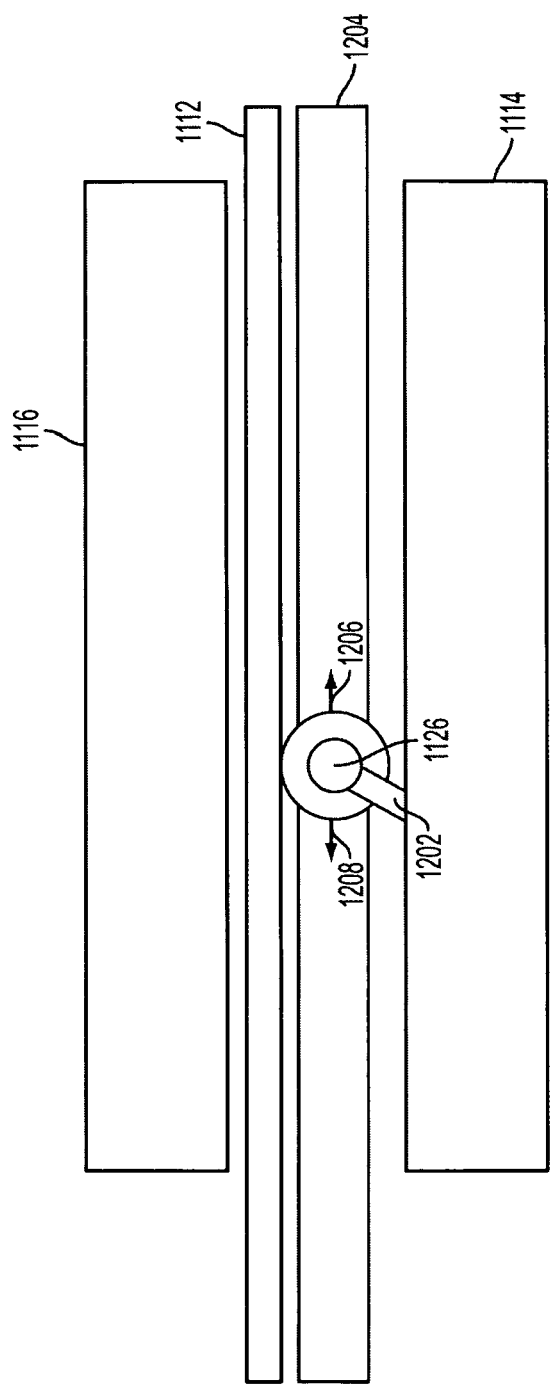
FIG. 12 illustrates one embodiment of a portion of the floor area of FIG. 11 showing a robot arm in additional detail.

FIG. 12 illustrates one embodiment of a portion of the floor area 1100 showing a robot arm 1126 in additional detail. A portion of the intermediate transport system 1112 is illustrated running between robot accessible bin units 1116, 1114. The robot arm 1126 is illustrated with an extendible arm portion 1202 comprising an picking implement (not shown) for picking and placing product units and/or trays comprising product units. The picking implement may be any suitable mechanical device for securing trays and/or product units including, for example, a jaw, a claw, a hand, a magnet, a suction device, etc. The robot arm 1126 may be translatable along a rail 1204. For example, the robot arm 1126 may be translatable in the directions of arrows 1208 and 1206. In this way, the robot arm 1126 may be capable of reaching robot accessible bins located at different spatial locations within the robot accessible bin units 1116, 1114.

Figure 13:
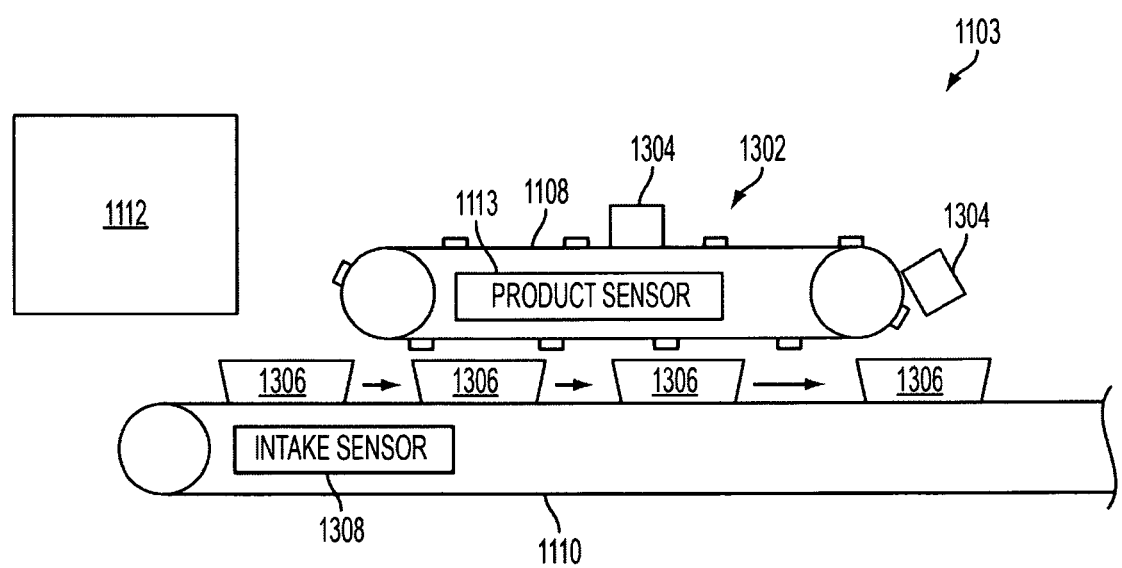
FIG. 13 illustrates one embodiment of the intake station of the floor area of FIG. 11.
Figure 14:
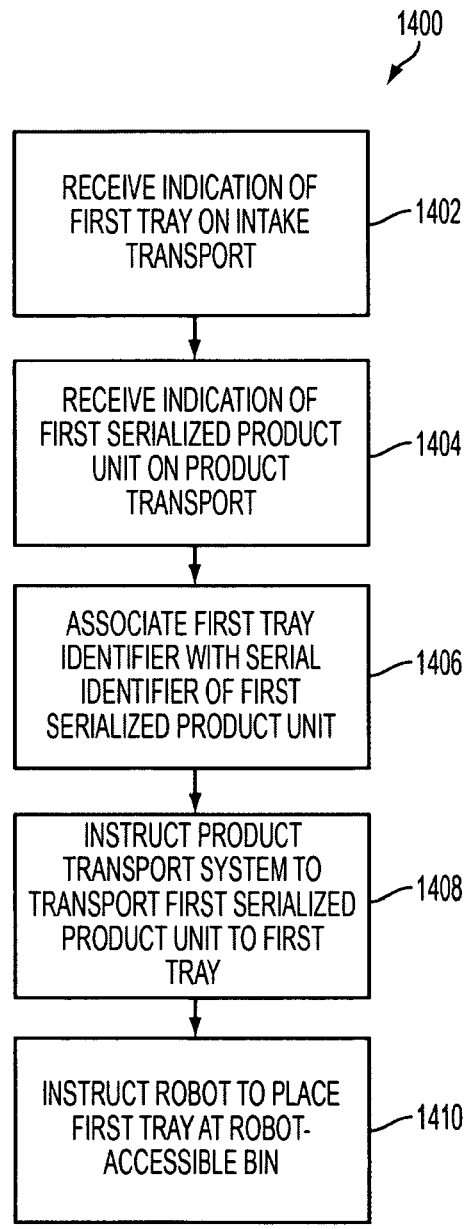
FIG. 14 illustrates one embodiment of a process flow for inducting product units into the robot accessible bins via the intake station.

FIG. 13 illustrates one embodiment of the intake station 1103 of the floor area 1100 showing additional details of, for example, the intake product transport system 1108 and the intake transport system 1110. FIG. 14 illustrates one embodiment of a process flow 1400 for inducting product units into the robot accessible bins 602 via the intake station 1103. The process flow 1400 is described herein with reference to FIGS. 11, 12, 13 and 14. Also, as described herein, the actions of the process flow 1400 are performed by the product reservation system 102. According to various embodiments, however, some or all of the actions of the process flow 1400 may be performed by the warehouse control system 104, one or more of the robot control computer systems 1102, 1104, 1106, etc.

At 1402, the product reservation system 102 may receive a unique indication of a first tray 1306 on the intake transport system 1110. For example, the indication may be received from an intake sensor 1308 positioned to scan a bar code or other computer readable tray identifier. The intake sensor 1308, according to various embodiments, may have a field of view directed towards the intake transport system 1110 such that the tray 1306 falls within the field of view. The tray 1306 may be manually or automatically placed on the intake transport system 1110. At 1404, the product reservation system 102 may receive an indication of a first serialized product unit 1304 on the product intake transport 1108. For example, a product sensor 1113 present at a known location on the product intake transport 1108 may sense (e.g., via a bar code or other computer readable indicator) the unique serial identifier of the serialized product unit 1304. The product sensor 1113, according to various embodiments, may have a field of view directed towards the product intake transport 1108 such that the serialized product unit 1304 falls within the field of view. The product reservation system 102 may derive a location of the product unit 1304 on the product intake transport 1108, for example, based on the reading from the product sensor 1113. Also, according to various embodiments, the product transport system 1108 may comprise one or more delineated locations 1302. An intake monitoring system 1112 may provide an indication to a manual worker an indication to place the product unit 1304 at the delineated location 1302. The product reservation system 102 may track the location of the unit 1304 based on the known location of the delineated location 1302 and/or based on input from an intake transport system sensor (not shown) positioned to sense a position of the intake transport system 1108.

At 1406, the product reservation system 102 may associate the first tray 1306 with the first serialized product unit 1304, for example, by storing an association between the unit's unique serial identifier and the unique indication of the first tray 1306. At 1408, the product reservation system 102 may instruct the product transport system 1108 and the intake transport system 1110 to place the first serialized product unit 1304 into the tray 1306. This process may occur according to any suitable method. For example, as illustrated in FIG. 13, the product transport system 1108 may be positioned above the intake transport system 1110. Accordingly, when the unit 1304 reaches an end of the product transport system 1108, it may fall into the tray 1306, as shown. Placing the first serialized product unit 1304 into the tray 1306 may comprise positioning the product transport system 1108 and the intake transport system 1110 such that the tray 1306 is positioned to catch the unit 1304 at the end of the product transport system 1108, as illustrated in FIG. 13.

At 1410, the product reservation system 102 may instruct the robot to place the tray 1306 (and also the first serialized product unit 1304) at a robot accessible bin. For example, as illustrated in FIG. 11, after the tray 1306 is placed on the intake transport system 1110, it may be transported to the intermediate transport system 1112, which may take the tray 1306 between the robot accessible bin units 1114, 1116. There, one of the robot arms 1126 may pick up the tray 1306 and place it at one of the robot accessible locations 602. According to various embodiments, the instruction to the robot may also comprise an indication of the turn-over rate of the product associated with the product 1304 present at the tray 1306. The robot may utilize this information to place the tray 1306 within the robot accessible bins. For example, trays 1306 comprising product units 1304 having a high turn-over may be stored at bins that may be easily accessible by the robot. Trays 1306 comprising product units 1304 having lower turn-over may be stored at bins that are not as quickly or easily accessible. According to various embodiments, product units 1304 may be classified into three categories based on availability. An "A" category may indicate product units 1304 having the highest turn-over. A "B" category may indicate product units 1304 having an intermediate turn-over rate. A "C" category may indicate product units 1304 having a low turn-over rate.

Figure 15:
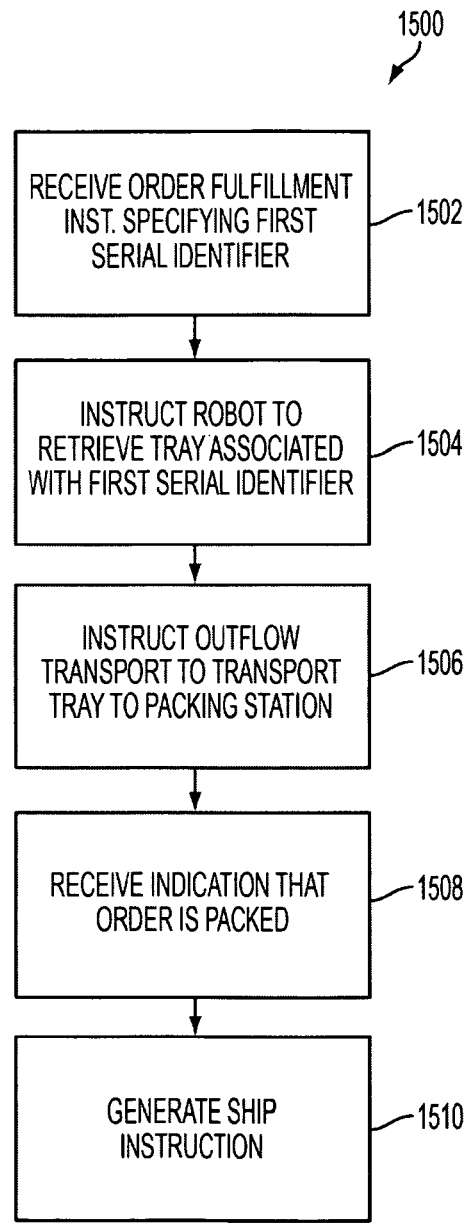
FIG. 15 illustrates one embodiment of a process flow for picking, packing and shipping an order specifying a serial product unit.

FIG. 15 illustrates one embodiment of a process flow 1500 for picking, packing and shipping an order specifying a serial product unit. The process flow 1500 is described as being performed by the product reservation system 102. It will be appreciated, however, that some or all of the actions of the process flow 1500 may be performed by other systems including, for example, the warehouse control system 104, the ERP system 118, the robot control systems 1102, 1104, 1106, etc. At 1502, the product reservation system 102 may receive and/or generate an order fulfillment instruction. The order fulfillment instruction may comprise an entry for a serial product that specifies the serial identifier of the unit 1304 of the serial product. At 1504, the product reservation system 102 may instruct the robot to retrieve the tray 1306 including the serial product unit 1304. Accordingly, one of the robot arms 1126 may translate on the rail 1204 to a location corresponding to the inventory bin comprising the tray 1306. The robot arm 1126 may retrieve the tray and place it on the intermediate transport system 1112.

At 1506, the product reservation system 102 and/or the warehouse control system 104 may instruct the transport system 1112 to transport the tray 1306 to a packing station 1118. For example, after being placed in the intermediate transport system 1112, the system 1112 may rotate counter-clockwise (relative to FIG. 11) moving the tray 1306 to the packing stations 1118. When the tray 1306 is adjacent a selected packing station, the intermediate transport system 1112 may deploy a directing device to move divert the tray toward the packing station 1118. The directing device may be, for example, an arm positioned to swing across the intermediate transport system 1112, a set of rollers positioned to roll orthogonal to the direction of motion of the system 1112 and towards the packing station 1118, etc. At 1508, the product reservation system 102 and/or the warehouse control system 104 may receive an indication that an order including the unit 1304 is packed. For example, after the unit 1304 is packed into a carton, the carton may be placed on an outflow transport system 1122 which may direct the carton towards one or more shipping stations 1128. Upon receipt of the indication that the unit 1304 is packed for shipping, the product reservation system 102 and/or the warehouse control system 104 may generate a ship instruction at 1510. The ship instruction may be result in a shipping label being generated and applied to the carton at labeling device 1124. According to various embodiments, the tray 1306 and unit 1304 may be processed for packing and shipping as described above with respect to the packing portion 803 of the process flow 800 described above.

Different computer systems 100, 102, 104, 118, 114, 120, 1102, 1104, 1106 are described herein as communicating with one another. It will be appreciated that this communication may take place in any suitable method. For example, according to various embodiments, some or all of the computer systems described herein may be in communication with one another via a network or networks. The network or networks may operate according to any suitable wired or wireless communication protocol and may utilize any suitable hardware or software. In some embodiments, the network or networks may include, a wide area network (WAN) such as the Internet, a local area network (LAN), etc.

Although the functions described herein are described in terms of multiple computer systems (e.g., product reservation system 102, warehouse control system 104, enterprise resource planning system 118, etc.), it will be appreciated than any of the functionality of these or other systems may be distributed across more or fewer physical computer systems. Also, according to various embodiments, any of the various computer systems herein may be implemented as multiple computer systems. For example, different computer systems may manage different types of inventory bins.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, methods or processing structures described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused descriptions would not facilitate a better understanding of the present invention, and therefore, a more detailed description of such elements is not provided herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes. The processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers or computer systems described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO-.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

We claim:

1. A method for managing an inventory comprising serialized products, the method comprising:
    receiving, by a computer system and from an intake sensor a first tray identifier describing a first tray present on an intake transport system, wherein the computer system comprises at least one processor and operatively associated memory;
    associating, by the computer system, the first tray identifier with a first serial identifier of a first product unit of a first serialized product, wherein the first product unit is present on a product transport system;
    instructing the product transport system, by the computer system, to transport the first product unit to the first tray;
    instructing a robot, by the computer system, to place the first tray containing the first product unit at a first bin selected from a plurality of robot-accessible bins;
    receiving, by the computer system, a pick instruction specifying the first serial identifier;
    instructing the robot to retrieve the first tray unit from the first robot-accessible bin and place it on an outflow transport system, wherein the outflow transport system transports the first product unit to a packing station.

2. The method of claim 1, further comprising deriving, by the computer system, a position of the first product unit on the product transport system.

3. The method of claim 2, wherein the product transport system comprises a plurality of delineated locations, and wherein deriving the position of the first product unit on the product transport system comprises:
    receiving data indicating that a first delineated location of the product transport system comprises a product unit having the first serial identifier; and
    receiving data indicating a position of the first delineated location.

4. The method of claim 3, further comprising receiving, by the computer system and from a product sensor, data describing the first serial identifier.

5. The method of claim 1, further comprising instructing the outflow transport system, by the computer system, to direct the first product unit to the packing station.

6. The method of claim 1, wherein the pick instruction also specifies a non-serialized product, and further comprising:

receiving, by the computer system, a second tray identifier describing a second tray associated with at least one item of the non-serialized product;

receiving, by the computer system, an indication that the second tray is present on the outflow transport system;

instructing the outflow transport system, by the computer system, to transport the second tray to the packing station.

7. The method of claim 1, wherein instructing the robot to place the first tray containing the first product unit at a first bin selected from the plurality of robot-accessible bins comprises providing the robot with an indication of a turn-over rate of the first serialized product.

8. The method of claim 1, wherein the intake transport system and the outflow transport system are components of a common transport system.

9. The method of claim 1, wherein the outflow transport system comprises at least one conveyor.

10. The method of claim 1, wherein each of the first plurality of robot-accessible bins comprises no more than one serialized product unit.

11. The method of claim 1, wherein the product transport system is positioned above the intake transport system, and wherein transporting the first product unit to the first tray comprises dropping the first product unit from the product transport system to the tray on the intake transport system.

12. The method of claim 1, wherein the intake transport system comprises at least one conveyor.

13. A method for managing an inventory comprising serialized products, the method comprising:

receiving, by a computer system and from an intake sensor a first tray identifier describing a first tray present on an intake transport system, wherein the computer system comprises at least one processor and operatively associated memory;

associating, by the computer system, the first tray identifier with a first serial identifier of a first product unit of a first serialized product, wherein the first product unit is present on a product transport system;

instructing the product transport system, by the computer system, to transport the first product unit to the first tray, wherein the product transport system is positioned above the intake transport system, and wherein transporting the first product unit to the first tray comprises dropping the first product unit from the product transport system to the tray on the intake transport system; and instructing a robot, by the computer system, to place the first tray containing the first product unit at a first bin selected from a plurality of robot-accessible bins.

\* \* \* \* \*